US010173677B2

(12) United States Patent
Fairgrieve et al.

(10) Patent No.: US 10,173,677 B2
(45) Date of Patent: Jan. 8, 2019

(54) SYSTEM AND METHOD FOR CONTROLLING VEHICLE SPEED TO ENHANCE OCCUPANT COMFORT

(71) Applicant: Jaguar Land Rover Limited, Whitley Coventry Warwickshire (GB)

(72) Inventors: Andrew Fairgrieve, Rugby (GB); James Kelly, Solihull (GB); Daniel Woolliscroft, Birmingham (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 0 days.

(21) Appl. No.: 14/421,911

(22) PCT Filed: Aug. 15, 2013

(86) PCT No.: PCT/EP2013/067092
§ 371 (c)(1),
(2) Date: Feb. 16, 2015

(87) PCT Pub. No.: WO2014/027069
PCT Pub. Date: Feb. 20, 2014

(65) Prior Publication Data
US 2015/0203116 A1 Jul. 23, 2015

(30) Foreign Application Priority Data
Aug. 16, 2012 (GB) .................................... 1214651

(51) Int. Cl.
*B60W 30/14* (2006.01)
*B60T 8/175* (2006.01)
(Continued)

(52) U.S. Cl.
CPC ........... *B60W 30/143* (2013.01); *B60T 8/175* (2013.01); *B60W 10/11* (2013.01);
(Continued)

(58) Field of Classification Search
CPC ........ B60K 28/16; B60K 31/02; B60K 31/04; B60T 2201/04; B60T 2210/14;
(Continued)

(56) References Cited

U.S. PATENT DOCUMENTS 6,125,320 A * 9/2000 Hellmann ............ B60K 31/042
340/441
6,266,604 B1 * 7/2001 Linden ................... B60K 31/04
180/197

(Continued)

FOREIGN PATENT DOCUMENTS

JP H10264681 A 10/1998
JP 2002521272 A 7/2002
(Continued)

OTHER PUBLICATIONS

International Search Report for application No. PCT/EP2013/067092, dated Nov. 15, 2013, 3 pages.
(Continued)

*Primary Examiner* — Angelina Shudy
(74) *Attorney, Agent, or Firm* — Reising Ethington P.C.

(57) ABSTRACT

A method for operating a speed control system of a vehicle is provided. The method comprises receiving one or more electrical signals representative of vehicle-related information. The method further comprises determining, based on the signals representative of vehicle-related information, whether one or more predetermined conditions are met. The method still further comprises automatically determining a baseline set-speed for the speed control system when it is determined that at least certain of the one or more predetermined conditions are met. The method yet still further comprises adjusting the baseline set-speed to determine an instantaneous set-speed of the speed control system based on a signal indicative of a desired comfort level. A speed control system comprising an electronic control unit con- (Continued)

figured to perform the above-described methodology is also provided.

23 Claims, 5 Drawing Sheets

(51) Int. Cl.
*F16H 61/02* (2006.01)
*B60W 10/11* (2012.01)
*B60W 10/184* (2012.01)
*B60W 30/18* (2012.01)
*F16H 59/66* (2006.01)

(52) U.S. Cl.
CPC .... *B60W 10/184* (2013.01); *B60W 30/18172* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 2510/0604* (2013.01); *B60W 2510/0657* (2013.01); *B60W 2510/182* (2013.01); *B60W 2510/20* (2013.01); *B60W 2510/205* (2013.01); *B60W 2520/10* (2013.01); *B60W 2520/105* (2013.01); *B60W 2520/12* (2013.01); *B60W 2520/14* (2013.01); *B60W 2520/16* (2013.01); *B60W 2520/18* (2013.01); *B60W 2520/26* (2013.01); *B60W 2550/12* (2013.01); *B60W 2550/14* (2013.01); *B60W 2550/141* (2013.01); *B60W 2720/30* (2013.01); *B60Y 2200/20* (2013.01); *F16H 59/66* (2013.01); *F16H 2061/0234* (2013.01); *Y02T 10/7258* (2013.01)

(58) Field of Classification Search
CPC ............. B60T 2210/16; B60T 2220/04; B60T 2260/06; B60T 8/175; B60W 10/11; B60W 10/184; B60W 2510/0604; B60W 2510/0657; B60W 2510/182; B60W 2510/20; B60W 2510/205; B60W 2520/10; B60W 2520/105; B60W 2520/12; B60W 2520/14; B60W 2520/16; B60W 2520/18; B60W 2520/26; B60W 2550/12; B60W 2550/14; B60W 2550/141; B60W 2720/30; B60W 30/14; B60W 30/143; B60W 30/146; B60W 30/18; B60W 30/18172; B60Y 2200/20; F16H 2061/0234; F16H 59/66; F16H 61/0213; Y02T 10/7258
USPC ............................................... 701/93, 94, 96
See application file for complete search history.

(56) References Cited

U.S. PATENT DOCUMENTS

| | | | | |
|---|---|---|---|---|
| 6,278,928 | B1* | 8/2001 | Aruga | F16H 59/66 477/97 |
| 6,374,168 | B1* | 4/2002 | Fujii | B60R 22/44 180/268 |
| 6,374,173 | B1* | 4/2002 | Ehlbeck | B60K 31/047 180/170 |
| 6,532,407 | B1* | 3/2003 | Fuhrer | B60K 31/047 280/5.5 |
| 6,836,719 | B2* | 12/2004 | Andersson | B60K 31/0058 123/352 |
| 6,859,703 | B2* | 2/2005 | Fuhrer | B60K 31/047 280/5.5 |
| 7,460,945 | B2* | 12/2008 | Boecker | B60K 31/18 180/170 |
| 8,554,443 | B2* | 10/2013 | Ohbayashi | B60K 31/047 701/93 |
| 8,583,329 | B2* | 11/2013 | Breed | B60R 21/0134 180/167 |
| 8,676,464 | B2 | 3/2014 | Shimura et al. | |
| 8,868,312 | B2* | 10/2014 | Pedlar | B60K 31/047 123/350 |
| 8,954,255 | B1* | 2/2015 | Crawford | B60W 30/143 701/70 |
| 9,134,133 | B2* | 9/2015 | Denaro | G01C 21/32 |
| 9,187,097 | B2* | 11/2015 | Levin | B60W 50/0097 |
| 9,193,264 | B2* | 11/2015 | Johansson | B60K 31/00 |
| 9,248,836 | B2* | 2/2016 | Johansson | B60W 50/0097 |
| 9,283,844 | B2* | 3/2016 | Franganillo | B60K 23/00 |
| 9,365,110 | B2* | 6/2016 | Matsuda | B60W 10/06 |
| 9,533,684 | B2* | 1/2017 | Kelly | B60W 30/025 |
| 9,573,595 | B2* | 2/2017 | Fairgrieve | F16H 61/0213 |
| 9,657,833 | B2* | 5/2017 | Fairgrieve | F16H 61/0213 |
| 9,758,165 | B2* | 9/2017 | Kelly | B60W 50/085 |
| 9,776,634 | B2* | 10/2017 | Kelly | B60K 28/16 |
| 9,796,383 | B2* | 10/2017 | Fairgrieve | B60W 30/146 |
| 9,840,252 | B2* | 12/2017 | Bills | B60W 30/025 |
| 9,849,879 | B2* | 12/2017 | Kelly | B60W 30/143 |
| 9,914,454 | B2* | 3/2018 | Simmons | B60W 30/143 |
| 2002/0173881 | A1 | 11/2002 | Lash et al. | |
| 2003/0010152 | A1* | 1/2003 | Evans | F16H 61/46 74/730.1 |
| 2003/0014174 | A1* | 1/2003 | Giers | B60K 28/16 701/70 |
| 2003/0060961 | A1* | 3/2003 | Ishizu | B60W 10/06 701/93 |
| 2003/0109980 | A1* | 6/2003 | Kojima | B60K 31/0058 701/96 |
| 2003/0182046 | A1* | 9/2003 | Nada | B60K 31/042 701/93 |
| 2003/0200016 | A1* | 10/2003 | Spillane | B60G 17/0195 701/36 |
| 2004/0040765 | A1* | 3/2004 | Satou | B60K 31/04 180/170 |
| 2004/0084237 | A1* | 5/2004 | Petrie, Jr. | B60K 31/04 180/170 |
| 2004/0088098 | A1* | 5/2004 | Muehlbauer | B60K 31/0058 701/93 |
| 2005/0004732 | A1* | 1/2005 | Berry | B60W 10/06 701/48 |
| 2005/0114009 | A1* | 5/2005 | Hellmann | B60K 31/0008 701/93 |
| 2005/0137774 | A1* | 6/2005 | Rupp | B60K 31/0008 701/96 |
| 2006/0095190 | A1* | 5/2006 | Currie | B60W 30/14 701/79 |
| 2007/0150157 | A1* | 6/2007 | Lee | B60K 31/0066 701/93 |
| 2008/0243324 | A1* | 10/2008 | Harris | B60K 6/48 701/22 |
| 2009/0037062 | A1* | 2/2009 | Lee | B60W 30/045 701/70 |
| 2009/0240398 | A1* | 9/2009 | Nanami | B60W 40/04 701/41 |
| 2010/0045452 | A1* | 2/2010 | Periwal | B60Q 9/00 340/439 |
| 2010/0100295 | A1* | 4/2010 | Inoue | B60W 10/06 701/69 |
| 2010/0256835 | A1 | 10/2010 | Mudalige | |
| 2010/0292904 | A1* | 11/2010 | Taguchi | B60W 30/143 701/93 |
| 2011/0213527 | A1* | 9/2011 | Itabashi | B60W 10/06 701/37 |
| 2011/0320102 | A1* | 12/2011 | Ohbayashi | B60K 31/047 701/93 |
| 2012/0077638 | A1* | 3/2012 | Kumazaki | B60K 6/365 477/5 |
| 2012/0083985 | A1* | 4/2012 | Johansson | B60W 30/143 701/93 |
| 2012/0197501 | A1* | 8/2012 | Sujan | B60K 23/00 701/51 |
| 2012/0197504 | A1 | 8/2012 | Sujan et al. | |

(56) References Cited

U.S. PATENT DOCUMENTS

| | | | | |
|---|---|---|---|---|
| 2012/0316744 | A1* | 12/2012 | Shimura | B60T 8/1755 701/72 |
| 2014/0043152 | A1* | 2/2014 | Lippman | B60W 30/14 340/438 |
| 2014/0088849 | A1* | 3/2014 | Ham | B60W 30/143 701/70 |
| 2014/0163837 | A1* | 6/2014 | Um | B60W 30/143 701/93 |
| 2014/0200788 | A1* | 7/2014 | Eriksson | B60K 31/0058 701/93 |
| 2014/0316626 | A1* | 10/2014 | Amano | B60L 11/123 701/22 |
| 2014/0350789 | A1 | 11/2014 | Anker et al. | |
| 2015/0106007 | A1* | 4/2015 | Matsumura | B60W 30/143 701/408 |
| 2015/0151725 | A1* | 6/2015 | Clarke | B60W 30/00 701/28 |
| 2015/0151747 | A1* | 6/2015 | Fairgrieve | B60T 7/22 701/91 |
| 2015/0166062 | A1* | 6/2015 | Johnson | B60W 30/12 701/41 |
| 2015/0191160 | A1* | 7/2015 | Fairgrieve | B60K 31/02 701/93 |
| 2015/0203117 | A1* | 7/2015 | Kelly | B60K 31/02 701/91 |
| 2015/0217767 | A1* | 8/2015 | Kelly | B60K 28/16 701/93 |
| 2015/0217768 | A1 | 8/2015 | Fairgrieve et al. | |
| 2015/0217771 | A1* | 8/2015 | Kelly | B60W 30/025 701/93 |
| 2015/0239454 | A1* | 8/2015 | Sujan | F02D 41/1401 701/54 |
| 2016/0023658 | A1* | 1/2016 | Kelly | B60W 50/085 701/94 |
| 2016/0031444 | A1* | 2/2016 | Fairgrieve | B22D 21/005 701/93 |
| 2016/0100295 | A1* | 4/2016 | Pinard | G06Q 10/06 455/518 |
| 2016/0144721 | A1* | 5/2016 | Soo | B60L 7/26 701/22 |
| 2016/0194002 | A1* | 7/2016 | Kelly | B60W 50/14 701/22 |
| 2016/0224060 | A1* | 8/2016 | Yun | G06F 1/163 |
| 2016/0264136 | A1* | 9/2016 | Minoiu Enache | B60W 30/02 |
| 2016/0304080 | A1* | 10/2016 | Sugiyama | B60W 20/12 |
| 2017/0001645 | A1* | 1/2017 | Fairgrieve | B60K 28/16 |
| 2017/0043774 | A1* | 2/2017 | Kelly | B60K 31/02 |
| 2017/0106865 | A1* | 4/2017 | Lavoie | B60W 30/146 |
| 2017/0122430 | A1* | 5/2017 | Jerger | F16H 61/0213 |
| 2017/0158191 | A1* | 6/2017 | Bills | B60W 30/025 |
| 2017/0274878 | A1* | 9/2017 | Fairgrieve | B60K 28/16 |

FOREIGN PATENT DOCUMENTS

| | | |
|---|---|---|
| JP | 2003080970 A | 3/2003 |
| JP | 2007187090 A | 7/2007 |
| JP | 2008137442 A | 6/2008 |
| JP | 2009214768 A | 9/2009 |
| JP | 2010083402 A | 4/2010 |
| JP | 2014520699 A | 8/2014 |
| JP | 2015524772 A | 8/2015 |
| WO | 2007070160 A2 | 6/2007 |
| WO | 2010144028 A1 | 12/2010 |
| WO | WO2012042935 A1 | 4/2012 |

OTHER PUBLICATIONS

UK Combined Search and Examination Report for corresponding application No. 1314635.2, dated Mar. 26, 2014, 7 pages.
Written Opinion for application No. PCT/EP2013/067092, dated Nov. 15, 2013, 4 pages.
Japanese Office Action, in Japanese with English summary, corresponding to JP application No. 2015-526992, dated Apr. 5, 2016, 7 pages.
Chinese Office Action for CN application No. 201380043871.5, in Chinese with English translation, dated Jun. 15, 2016, 17 pages.
Chinese Office Action in Chinese with English translation for CN application No. 201380046871.5, dated Mar. 23, 2017, 17 pages.
English translation of Chinese Office Action for CN application No. 201380043871.5, dated Oct. 13, 2017, 9 pages.

\* cited by examiner

SYSTEM AND METHOD FOR CONTROLLING VEHICLE SPEED TO ENHANCE OCCUPANT COMFORT

TECHNICAL FIELD

The present invention relates generally to vehicle speed control and more particularly, to a method and system for controlling the speed of a vehicle capable of traversing a variety of different terrains and conditions, and doing so in an effort to enhance the comfort of the occupants of the vehicle.

BACKGROUND

In known vehicle speed control systems, typically referred to as cruise control systems, a set-speed for the vehicle may be initially set by a user (e.g., driver). So long as the speed control system remains in an active state, the speed control system attempts to maintain the speed of the vehicle at the designated set-speed as the vehicle progresses. One drawback of such known speed control systems, however, is that the systems may allow a user to select, and/or may maintain the vehicle speed at, a user-selected set-speed without regard to whether various conditions exist that, when encountered or met at certain vehicle speeds, may adversely affect vehicle composure and/or vehicle occupant comfort These conditions may include, for example, those related to the terrain the vehicle is traversing, the movement of the vehicle body, and the occupancy of the vehicle (e.g., the number of vehicle occupants and their respective locations within the vehicle), to name a few. For example, if the user selects, and/or the speed control system maintains the speed of the vehicle at, a set-speed that is too high for certain conditions when that or those conditions are encountered or met the comfort of the vehicle occupants, as well as the composure of the vehicle, could be significantly affected unless corrective measures are taken by the user, such as, for example, the deactivation of the speed control system.

Accordingly, there is a need for a speed control system and method for use with the same that minimizes and/or eliminates one or more of the above-identified deficiencies.

SUMMARY

According to one aspect of the invention for which protection is sought, there is provided a method for controlling the speed of a vehicle. The method comprises: receiving one or more electrical signals representative of vehicle-related information; determining, based on the signals representative of vehicle-related information, whether one or more predetermined conditions are met; when it is determined that at least certain of the one or more predetermined conditions are met, automatically determining a baseline set-speed for the speed control system; and based on a signal indicative of a desired comfort level, adjusting the baseline set-speed to determine an instantaneous set-speed for the speed control system.

According to another aspect of the invention for which protection is sought there is a provided a speed control system for a vehicle. The system comprises an electronic control unit that is configured to; receive one or more electrical signals representative of vehicle-related information; determine, based on the signals representative of vehicle-related information, whether one or more predetermined conditions are met; automatically determine a baseline set-speed for the speed control system when it is determined that at least certain of the one or more predetermined conditions are met; and based on a signal indicative of a desired comfort level adjust the baseline set-speed to determine an instantaneous set-speed for the speed control system.

According to another aspect of the invention for which protection is sought there is provided a vehicle comprising the system as described herein.

According to a further aspect of the invention for which protection is sought there is provided a carrier medium for carrying a computer-readable code for controlling a vehicle to carry out the method of the invention as described herein.

Use of speed control al low speeds when driving off-road may offer a user considerable advantages in reduced user workload and enhanced vehicle composure. However, a speed control system arranged to work off-road would not take into account that although a vehicle may be capable of maintaining a given speed over a varying terrain, some surfaces may be more uncomfortable to drive over than others at the same speed.

It is to be understood that embodiments of the present invention provide an off-road speed control system that is arranged to permit the user to operate the vehicle at low speeds off-road with the off-road speed control system regulating vehicle speed up to a user selected set-speed.

In some embodiments, the off-road speed control system is configured to fake into account at least one selected from amongst surface roughness, wheel slip and wheel articulation when determining a maximum speed at which the system will allow the vehicle to drive over a surface.

In some situations the speed control system may be perceived as intervening to reduce the maximum vehicle speed unnecessarily for some users, but intervening sufficiently in the opinion of others.

Off-road speed control systems according to the present invention are intended to enhance off-road driving, performance by reducing user workload and enhancing vehicle composure. It is to be understood that a level of vehicle composure may affect ail vehicle occupants and not just the person under whose control the vehicle is being operated.

In some embodiments there is provided an off-road speed control system that is provided, with at least one selected from amongst information or data in respect of terrain over which the vehicle is driving, vehicle attitude, wheel articulation, wheel speed, driving surface roughness, gear selection, tyre friction, tyre drag, rolling resistance and terrain response (TR) mode.

In an embodiment, the system is further provided with a memory, user operable input means such as a switch, a processor and seat occupancy data. The off-road speed control system may be operable to adjust a comfort setting of the speed control system being a setting used by the system to determine how much to slow the vehicle below a given set-speed for a given ground condition or terrain. The system may be operable, to adjust the comfort setting in dependence on data in respect of seat occupancy and an input signal received from the user operable input means.

In operation, the system is configured to log in the memory how the user adjusts the off-road speed control comfort setting for a given amplitude and frequency of vehicle vibration caused by the roughness of the terrain over which the vehicle is driving. When the system determines, for example, that a vehicle body vibration is similar to or otherwise matches a sample stored in the memory the processor generates a temporary default baseline set-speed limit below the speed control set-speed that was previously been set by the user. The temporary default baseline set-speed limit is set by the system for the duration of the particular section of terrain the vehicle is travelling over unless overridden by the user.

If the user overrides the system then data corresponding to the fact that the system was over-ridden may be stored in the memory. A look-up table is updated or a specific look up table associated with that driver may be generated. The look-up table contains data in respect of vehicle speed requested by a user as a function of, for example, vehicle vibration characteristic data. In some embodiments the speed control system updates the stored data only if the user repeatedly overrides the system.

In an embodiment of the system, if user adjustment of off-road speed control system speed in respect of a particular user indicates a trend to override the automated speed reduction feature towards a higher speed, then the off-road speed control system may be configured to adopt a user specific baseline speed limit that is higher than the default baseline speed limit for a given type of terrain. That is, a speed limit to which the system may reduce the set-speed in the event that such terrain is encountered is higher than a default baseline speed limit for that type of terrain. As noted above, in some embodiments terrain 'type' may be quantified by reference to amplitude and frequency of vehicle vibration, optionally wheel articulation, optionally one or more other parameters in addition or instead, such as a value of one or more parameters for a given selected TR mode.

In some embodiments the user specific baseline speed limit may be manually reset by a user such that the system employs the default value of maximum off-road speed control speed, which may be lower than the driver specific baseline speed. In some embodiments the default value may in fact be higher than the driver specific speed.

In some embodiments, in addition or instead, the system may be operable to detect that the off-road speed control system is being employed on a journey where the vehicle is carrying one or more passengers. If such a determination is made the system may be operable to reset a user-specific baseline off-road speed control system speed to the default baseline speed limit.

It is to be understood that in scenarios in which a user typically uses the off-road speed control system when driving alone, the user may opt to accept less vehicle composure in order to drive the vehicle at a faster speed over a given surface. As the user is in control of the vehicle, the movement of the vehicle is likely to be perceived by the user as being in line with their expectations and therefore acceptable. Furthermore, a driver may steady him or herself against a steering wheel and therefore tolerate more vehicle body movement than a passenger might be comfortable with. A passenger, who is not in control of the vehicle, may perceive the same vehicle movement or vibration as being unacceptably uncomfortable. To compensate for this, in some embodiments, when the system detects that the vehicle is carrying one or more passengers, the system defaults to a comfort and composure orientated speed adjustment mode (in which the maximum speed corresponds for example to the default baseline value), unless and until the user manually overrides the setting.

The speed control system may be operable to monitor one or more parameters influencing vehicle body movement and therefore occupant comfort such as a steering wheel or steerable road wheel angle and/or a rate of change thereof. The system may be operable to monitor data indicative of driving surface roughness and correlate this data with one or more vehicle parameters that may influence vehicle body movement such as steering wheel angle, steerable road wheel angle or a rate of change thereof, in the event a user overrides the speed control system, indicating that they feel the speed is too high, the system may determine whether the user chose to override the system because of a feature of terrain over which the vehicle is travelling, or because of another factor influencing vehicle body movement. An example of such a factor might be an action by a driver such as abrupt turning of the steering wheel on terrain that would otherwise not cause excessive user discomfort, in some embodiments the system may take into account vehicle roll angle; for example if the vehicle is driving across a gradient a user may be more sensitive to the fact that the vehicle is tilted about its longitudinal axis and require the system to reduce the set speed even when the terrain is relatively smooth.

Thus it is to be understood that the speed control system may be configured to log data indicating steering wheel angle, steerable road wheel angle or rate of change of one or both, optionally vehicle roll angle, lateral acceleration and the like and be able to determine whether the fact that a user chose to over-ride the speed control system to reduce set speed is because of terrain roughness alone or because of a combination of terrain roughness and one or more other parameters affecting body movement. The system may be configured to take into account whether or not passengers are being carried when a user intervenes to reduce set speed, in the event passengers are not being carried, the vehicle may determine that if a similar scenario is encountered when passengers are being carried in the future, set speed may be reduced to an even lower level than that to which it was reduced when the user was the sole occupant. Furthermore, the system may be operable to reduce set speed when reduced values of one or more parameters affecting vehicle body roll are detected in the future, in the expectation that passengers may be less tolerant of certain body movements than a driver. Furthermore, such action may be prudent also since a centre of gravity of a vehicle may rise in the presence of one or more passengers, resulting in an increased tendency for a vehicle body to move when travelling over certain terrain, in this way, vehicle body movement, whilst the vehicle is under control of the speed control system (e.g., low-speed progress (LSP) control system), is managed at least in part, to balance the desire to maintain good progress off-road with the need to manage certain factors that may influence or otherwise affect the comfort of each occupant of the vehicle.

In an embodiment, the LSP control system is operable to receive data indicative of seat occupancy of the vehicle. That is, data indicative as to whether a given seat of the vehicle other than a driver's seat is occupied. For example, the LSP control system receives data corresponding to a state of a switch embedded in a seat belt buckle associated with each seat, if the state of the switch indicates that the buckle is fastened, the LSP control system considers that the seat associated with the buckle is occupied. If the state of the switch indicates the buckle is unfastened, the LSP control system considers that the seat associated with the buckle is unoccupied. Seat occupancy may be determined by sensors in each seat or by means of an infrared or visible light camera arranged to observe the interior of the occupant compartment Other means for determining seat occupancy are also useful. The memory of or associated with the LSP control system may be divided so as to store data in respect of a plurality of known drivers and their associated preferences. The system may be arranged to identify a driver by identification of one selected from amongst a seat adjustment position, a user specific key fob identity, or other known means. In one arrangement a camera may be provided to determine the occupant's movement relative to the vehicle, and such information is included within the definition of vehicle related information. The comfort level may be determined by one of more of the magnitude and frequency of the occupant's movement relative to the vehicle.

In some embodiments, the maximum speed (set-speed limit) imposed automatically by the system may be adjusted automatically by the system based on duration and vehicle behaviour in dependence on a determination that vehicle body acceleration exceeds a pre-determined threshold. This may be used to enhance vehicle composure and act as a means for determining vehicle movement independently of an output of one or more wheel speed sensors. This may be useful in situations in which no two wheel speed readings match each other.

This feature may be employed across multiple vehicle variants with different suspension spring/damper settings and be used in vehicles whose characteristics may vary over time. Employment of vehicle body acceleration measurements may free the speed control system from being tied to a specific vehicle or suspension variant.

It is to be understood that in some embodiments an off road speed control system may be operable in either forward or reverse driving use.

It is to be understood that an off-road speed control system according to an embodiment of the present invention may form part of an ATPC (All-Terrain Progress Control) system or LSPC (Low Speed Progress Control) system, which may be arranged to work independently or in conjunction with one or more vehicle control systems arranged to optimise one or more vehicle configurations such as one or more sub-system configurations for a given terrain over which the vehicle is travelling. An example of such a system is a Terrain Response (RTM) system.

Embodiments of the present invention have the advantage that they may improve vehicle composure substantially. In particular, some embodiments enhance enjoyment of a vehicle by a given user when driving alone and passengers when being carried by the same user, since the level of vehicle composure that may be tolerated by one or more passengers may differ from that which may be tolerated by the user.

DESCRIPTION OF THE DRAWINGS

One or more embodiments of the invention will now be described, by way of example only, with reference to the following figures in which.

DETAILED DESCRIPTION

The method and system described herein may he used to control the speed of a vehicle, in one embodiment, the present method and system determine whether one or more conditions are met, and if at least certain of those conditions are met, the system and method automatically set a maximum set-speed that a user may command and at which the vehicle may be operated when that or those conditions are met.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present invention.

Figure 1:
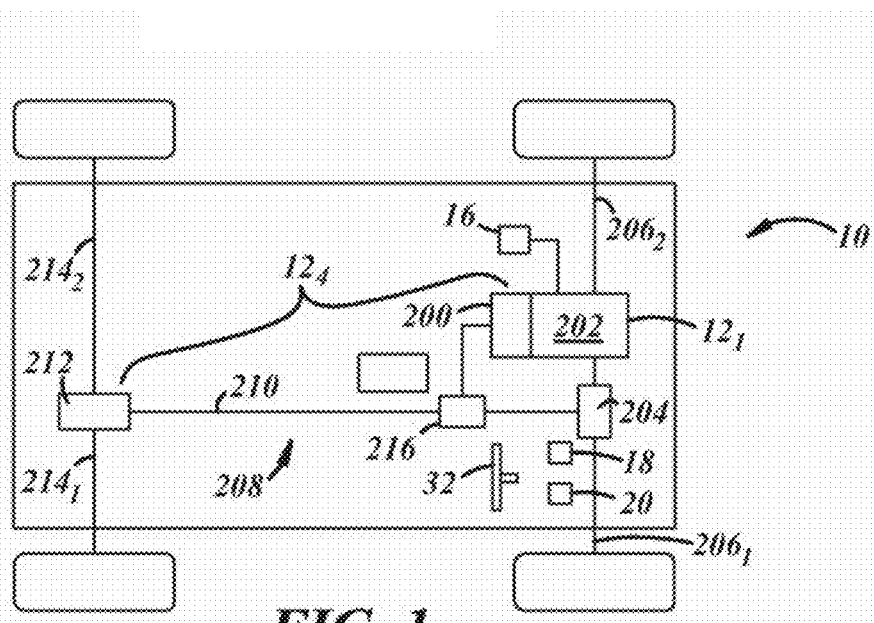
FIG. 1 is a schematic and block diagram of a vehicle.
Figure 2:
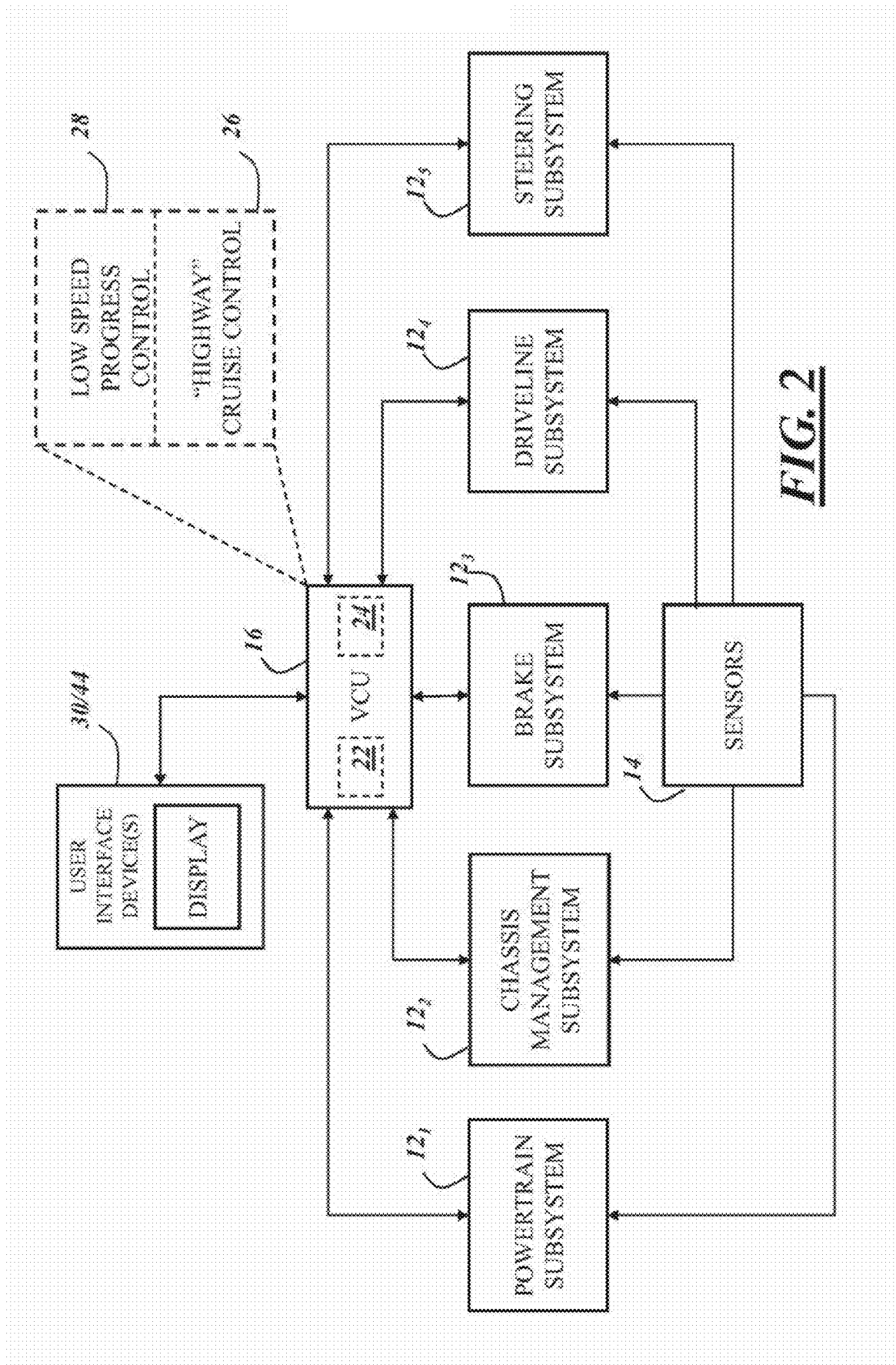
FIG. 2 is another block diagram of the vehicle illustrated in FIG. 1.

With reference to FIGS. 1 and 2, there are shown some of the components of a vehicle 10, with which the present method and system may be used. Although the following description is provided in the context of the particular vehicle 10 illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to one embodiment, vehicle 10 generally includes a plurality of subsystems 12, a plurality of vehicle sensors 14, and a vehicle control unit 16 (VCU 16), among any number of other components, systems, and/or devices not illustrated or otherwise described herein.

Subsystems 12 of vehicle to may be configured to perform or control various functions and operations relating to the vehicle and, as illustrated in FIG. 2, may include any number of subsystems, such as, for example, a powertrain subsystem $12_1$, a chassis control or management subsystem $12_2$, a brake subsystem $12_3$, a driveline subsystem $12_4$, and a steering subsystem $12_5$, to cite only a few possibilities.

As is well known in the art, powertrain subsystem $12_1$ is configured to generate power or torque that is used to propel the vehicle. The amount of torque generated by the powertrain subsystem may also be adjusted so as to control the speed of the vehicle (e.g., to increase the speed of vehicle 10, the torque output is increased). The amount of torque that a powertrain subsystem is capable of outputting is dependent upon the particular -type or design of the subsystem, as different powertrain subsystems have different maximum output torque capacities, in one embodiment, however, the maximum output capacity of powertrain subsystem $12_1$ of vehicle 10 may be in the order of 600 Nm. As is known in the art, powertrain output torque may be measured using one or more of vehicle sensors 14 described below (e.g., an engine toque sensor, a driveline torque sensor, etc.) or other suitable sensing means and may be used for a variety of purposes by one or more, components, modules, or subsystems of vehicle 10, in addition to powertrain subsystem $12_1$, including, for example and without limitation, one or more of those described below. Those having ordinary shill in the art will appreciate that powertrain subsystem 125 may be provided according to any number of different embodiments, may be connected in any number of different configurations, and may include any number of different components, like output torque sensors, control units, and/or any other suitable components know in the art. Accordingly, the present invention is not limited to any one particular powertrain subsystem.

Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name only a few. To that end, and as is well known in the art, chassis management subsystem $12_2$ is further configured to monitor and/or control a variety of aspects or operational parameters of the vehicle using, for example, readings, signals, or information it receives from one or more of sensors 14 and/or other vehicle subsystems 12 described or identified herein. For example, subsystem $12_2$ may be configured to receive readings or other information relating to the pressure of the tyres of the vehicle from, for example, tyre pressure sensors associated with each tyre. As such, chassis management subsystem $12_2$ may monitor the tyre pressure and, if necessary, and if the vehicle is so configured, to automatically make, or cause to be made, adjustments to the pressure using an air compressor onboard the vehicle. Similarly, chassis management system $12_2$ may also be configured to receive readings or other information relating to the ride height of the vehicle from, for example, one or more air suspension sensors that may be distributed about the vehicle, in such an instance, chassis management subsystem $12_2$ may monitor the ride height of the vehicle and, if necessary, and if the vehicle is so configured, to automatically make, or cause to be made, adjustments to the ride height using an air compressor (suspension compressor) onboard the vehicle. Chassis management subsystem $12_2$ may further be configured to monitor the attitude of the vehicle. More particularly, subsystem $12_2$ may receive readings or information from one or more of sensors 14 and/or subsystems 12 described or identified herein (e.g., gyro sensors, vehicle acceleration sensors, etc) to evaluate the pitch, mil, yaw; lateral acceleration, vibration (e.g., amplitude and -frequency) of the vehicle (and/or the vehicle body, in particular), and therefore, the overall attitude of the vehicle, in each instance, the information received or determined by chassis management subsystem $12_2$ may be utilized solely thereby, as described above, or may alternatively be shared with other subsystems 12 or components (e.g., VCU 16) of vehicle 10 which may use the information for any number of purposes. While only a few examples of operational parameters and/or aspects of the vehicle that chassis management subsystem $12_2$ may monitor and/or control have been provided, if will be appreciated that subsystem $12_2$ may be configured to control and/or monitor any number of other or additional parameters/aspects of vehicle 10 in the same or similar manner as that described above. As such, the present invention is not limited to the control and/or monitoring of any particular parameters/aspects. Moreover, it will be further appreciated that chassis management subsystem $12_2$ may be provided according to any number of different-embodiments and may include any number of different components, like sensors, control units, and/or any other suitable components known in the art. Accordingly, the present invention is not limited to any one particular chassis management subsystem.

As illustrated in FIG. 1, driveline subsystem $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, drlvellne subsystem $12_4$ also comprises an auxiliary drlvellne portion 208 arranged to drive the rear wheels of vehicle 10 by means of an auxiliary driveshaft or prop-shaft 210, a rear differential 212, and a pair of rear drive shafts $214_1$, $214_2$. In various embodiments, drlvellne subsystem $12_4$ may be arranged to drive only the front wheels or the rear wheels, or selectable two wheel drive/four wheel drive vehicles. In an embodiment such as that illustrated in FIG. 1, transmission 200 is releasably connectable to the auxiliary drlvellne portion 208 by means of a transfer case or power transfer unit 218, allowing selectable two wheel drive or four wheel drive operation. In certain instances, and as is well known in the art, transfer unit 216 may be configured to operate in either a high range (HI) or low range (LO) gear ratio, which may be adjustable by drlvellne subsystem $12_4$ itself and/or by another component of vehicle 10, such as, for example, VCU 16. Those having ordinary skill in the art will appreciate that drlvellne subsystem $12_4$ may be provided according to any number of different embodiments, may fee connected in any number of different configurations, and may include any number of different components, like sensors (e.g., HI/LO ratio sensor, transmission gear ratio sensors, etc.), control units, and/or any other suitable components known in the art. Accordingly, the present invention is not limited to any one particular drlvellne subsystem.

In addition to those subsystems described above, vehicle 10 may further comprise any number of other or additional subsystems, such as, for example, a brake subsystem $12_3$ and a steering subsystem $12_5$. For the purposes of this invention, each of the aforementioned subsystems 12, and the functionality corresponding thereto, is conventional in the art. As such, detailed descriptions will not be provided; rather, the structure and function of each identified subsystem 12 will be readily apparent to those having ordinary skill in the art.

In one embodiment, one or more of subsystems 12 may be under at least a certain degree of control by VCU 16. In such an embodiment, those subsystems 12 are electrically coupled to, and configured tor communication with, VCU 16 to provide feedback to VCU 16 relating to operational or operating parameters of the vehicle, as well as to receive instructions or commands from VCU 16. Taking powertrain subsystem $12_1$ as an example, powertrain subsystem $12_1$ may be configured to gather various types of information relating to certain operating parameters thereof, such as, for example, torque output, engine or motor speed, etc., and to then communicate that information to VCU 16, This information may be gathered from, for example, one or more of vehicle sensors 14 described below. Powertrain subsystem $12_1$ may also receive commands from VCU 16 to adjust certain operating parameters when, for example, a change in conditions dictates such a change (e.g., when a change in vehicle speed Has been requested via a brake pedal (pedal 18 in FIG. 1) or accelerator pedal (pedal 20 in FIG. 1) of vehicle 10). While the description above has been with particular reference to powertrain subsystem $12_1$, it will be appreciated that the same principle applies to each such other subsystem 12 that is configured to exchange information/commands with VCU 16.

Each subsystem 12 may comprise a dedicated electronic control unit (ECU) that is configured to receive and execute instructions or commands provided by VCU 16, and/or to perform or control certain functionality independent from VCU 16. Alternatively, two or more subsystems 12 may share a single ECU, or one or more subsystems 12 may be directly controlled by the VCU 16 itself. In an embodiment wherein a subsystem 12 communicates with VCU 16 and/or other subsystems 12, such communication may be facilitated via any suitable connection, such as, for example, a controller area network (CAN) bus, a system management bus (SMBus), a proprietary communication link, or through some other arrangement known in the art.

It will be appreciated that the foregoing represents only soma of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present invention.

Vehicle sensors 14 may comprise any number of different sensors, components, devices, modules, systems, etc. In one embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to vehicle 10 and the operation and configuration thereof, and may include, for example and without limitation, any one or more of: wheel speed sensor(s); ambient temperature sensor(s); atmospheric pressure sensor(s); tyre pressure sensor(s); gyro sensor(s) to detect yaw; roll, and pitch of the vehicle; vehicle speed sensor(s); longitudinal acceleration sensor(s); engine torque sensor(s); driveline torque sensor(s); throttle valve sensor(s); steering angle sensor(s); steering wheel speed sensor(s); gradient sensor(s); lateral acceleration sensor(s) on, for example, the stability control system (SCS); brake pedal position sensor(s); brake pedal pressure sensor(s); accelerator pedal position sensor(s); air suspension sensor(s) (i.e., ride height sensors); wheel position sensor(s); wheel articulation sensor(s); vehicle body vibration sensor(s); water detection sensor(s) (for both proximity and depth of wading events); transfer case HI-LO ratio sensor(s); air intake path sensor(s); vehicle occupancy sensor(s); and longitudinal lateral, and vertical motion sensor(s), among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc, Further, these sensors may be directly coupled to VCU 16 and/or to one or more of vehicle subsystems 12, indirectly coupled thereto via other electronic devices, vehicle communications bus, network, etc, or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 may receive certain information from the ECU of a subsystem 12 rather than directly from a sensor 14. It should be appreciated that the foregoing scenarios represent only some of the possibilities, as vehicle 10 is not limited to any particular sensor(s) or sensor arrangements); rather any suitable embodiment may be used.

VCU 16 may comprise any suitable ECU, and may include any variety of electronic process devices, memory devices, input/output (I/O) devices, and/or other known components, and perform various control and/or communication related functions. In one embodiment, VCU 16 includes an electronic memory device 22 that may store various information, sensor readings (e.g., such as those generated by vehicle sensors 14), look-up tables or other data structures, algorithms (e.g., the algorithms embodied in the method described below), etc. In an embodiment, memory device 22 comprises a carrier medium carrying a computer-readable code for controlling the vehicle to carry out the method described below. Memory device 22 may also store pertinent characteristics and background information pertaining to vehicle 10 and subsystems 12. VCU 16 may also include an electronic processing device 24 (e.g., a microprocessor, a microcontroller, an application specific integrated circuit (ASIC), etc,) that executes instructions for software, firmware, programs, algorithms, scripts, applications, etc, that are stored in memory device 22 and may govern the methods described herein. As described above, VCU 16 may foe electronically connected to other vehicle devices, modules, subsystems, and components (e.g., sensors) via suitable vehicle communications and can interact with them when or as required. In addition to the functionality that may be performed by VCU 16 described elsewhere herein, in one embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above. In one embodiment, vehicle 10 may further comprise one or more vehicle speed control systems. For example and with continued reference to FIG. 2, in one embodiment, vehicle 10 may further comprise a cruise control System 26, also referred to as an "on-highway" or "on-road" cruise control system, and a low-speed progress (LSP) control system 28, which may be referred to an "off-highway" or "off-road" progress control system, On-highway cruise control system 26, which may comprise any number of conventional cruise control systems known in the art, is operable to automatically maintain vehicle speed at a desired "set-speed" set by the user. Such systems are generally limited in their use in that the vehicle must be travelling above a certain minimum threshold speed (e.g., 30 mph (approximately 50 kph)) far the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform, the functionality of the system, or alternatively, the functionality of cruise control system 26 may be integrated into another subsystem 12 of vehicle 10 (e.g., powertrain subsystem 12₁), or for example, VCU 16 (as is illustrated in FIG. 2).

Figure 3:
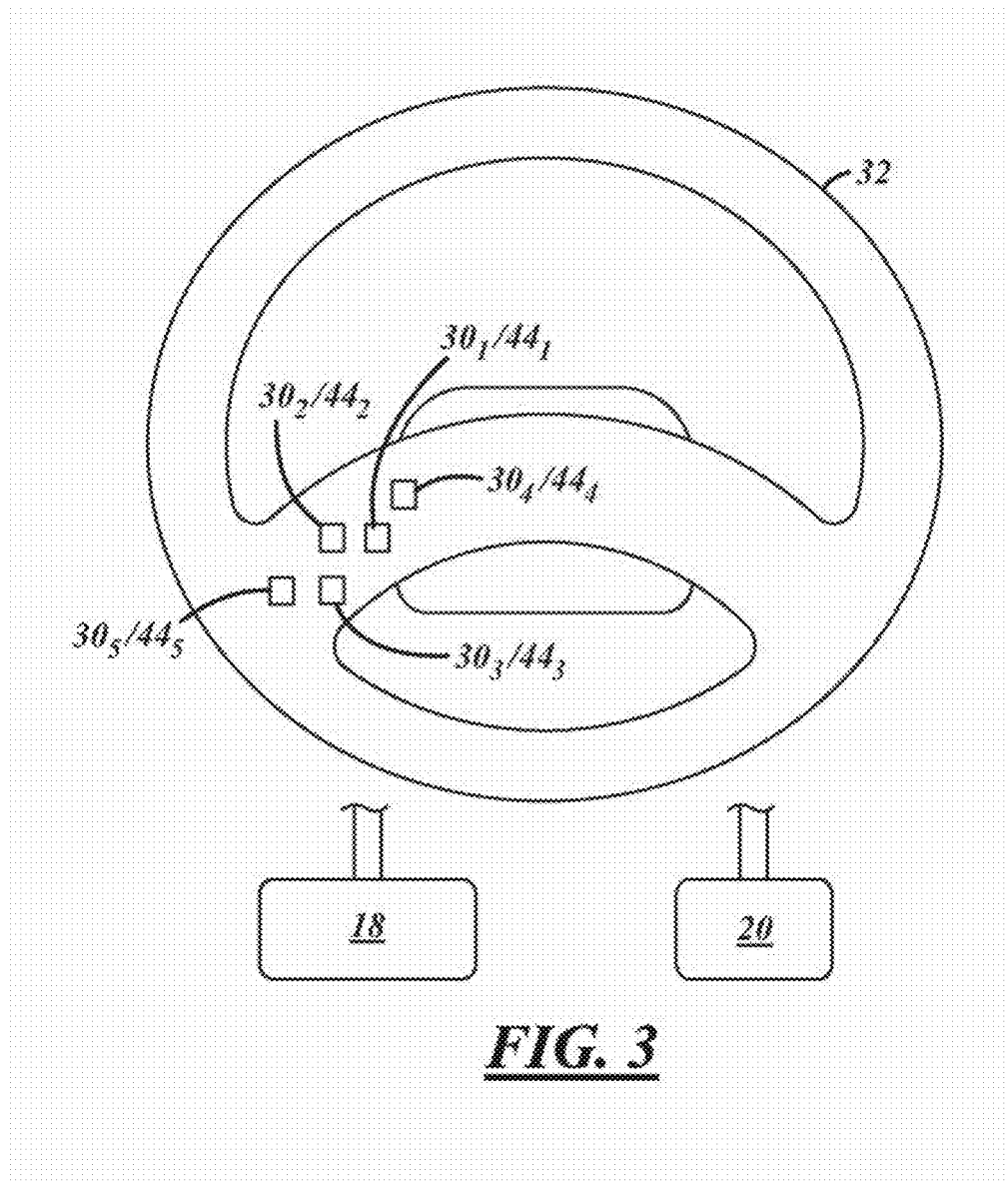
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, center console, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button 30₁ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button 30₂ may be provided to allow the user to increase the set-speed in discrete increments (e.g., 1 mph (or 1 kph)), and a "−" button 30₃ to allow the user to decrease the set-speed in the. same or different discrete increments. Alternatively, the "+" and "−" buttons 30₂, 30₃ may be integrated into a single user-selectable device. Additional user-selectable interface devices of system 26 may include, for example, a "cancel" button 30₄ to deactivate or suspend the system, as well as a "resume" button 30₅ to allow for the system to be re-activated following a temporary suspension or deactivation of the system function.

It should be appreciated that the foregoing scenarios represent only some of the possibilities of cruise control system 28 and the user interface devices thereof, as vehicle 10 is not limited to any particular cruise control system or user interface device or arrangement; rather, any suitable embodiments may be used.

LSP control system 26 provides a speed control system that enables, for example, the user of a vehicle equipped with such a system to select a very low target speed or set-speed at which the vehicle can progress without any pedal inputs being required by the user. This low-speed progress control function differs from that of cruise control system 26 in that unlike cruise control system 26, the vehicle need not be travelling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user depresses the brake or the clutch pedals, for example, the on-road cruise control function is cancelled and the vehicle reverts to a manual mode of operation requiring user pedal input to maintain vehicle speed. In addition, in at least certain cruise control systems, the defection of a wheel slip event, which may be initiated by a loss of traction, may also have -the effect of cancelling the cruise control function. LSP control system 28 may also differ from such cruise control systems in that, in at least one embodiment, it is configured in such a way that the speed control function provided thereby is net cancelled or deactivated in response to those events described above. In an embodiment, LSP control system 28 is particularly suited for use in off-road or off-highway driving.

In one embodiment, LSP control system 28 includes, among potentially other components, an ECU 42 (shown, in the illustrated embodiment and for reasons described below, as comprising VCU 16) and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: determining whether certain conditions relating to the vehicle and/or the operation thereof are met; automatically determining a maximum set-speed for the vehicle and/or adjusting the set-speed of the vehicle when if is determined that certain conditions are met; determining the type and/or characteristics of the terrain over which vehicle 10 is travelling; determining the number of occupants of the vehicle and their respective locations) within the vehicle cabin (e.g., front seat, back seat, etc.); determining the identity of the driver of the vehicle; determining or detecting movement of the vehicle body; selecting a desired set-speed for system 28 from a plurality of predefined set-speeds; determining whether a particular set-speed is appropriate for vehicle 10 and/or whether vehicle 10 is appropriately configured for a particular set-speed; etc. Further, in one embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up tables or other data structures, algorithms, software, and the like, required for performing the functionality of LSP control system 28, including that embodied in the method described below.

As with on-highway cruise control system 28 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, and otherwise interact with system 28 as may be described below. These user interface devices may also allow for system 28 to provide certain notifications, alerts, messages, requests, etc. to the user. Each of these devices may fake any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc). In one embodiment, user interface devices 30, 44 of on-highway cruise control system 26 and LSP control system 28, respectively, are arranged adjacent to one another within vehicle 10, and, in one embodiment, on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one embodiment of LSP control system 28 will now be provided. First VCU 16, which in the embodiment described herein comprises the ECU of LSP control system 28, determines the desired speed at which the vehicle is to travel (referred to herein as "the desired set-speed"). This may be a set-speed selected by the user via user interface devices 44, or alternatively, VCU 16 may be configured to automatically determine or select a desired set-speed based on certain conditions or factor's and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively or individually, to either achieve or maintain the vehicle at the desired set-speed, in one embodiment, this may comprise VCU 16 generating and sending appropriate commands to the appropriate subsystems 12 (such as powertrain subsystem $12_1$ and brake subsystem $12_3$), for example, and/or directly controlling the operation of one or more components, modules, subsystems, etc. of vehicle 10.

Figure 4:
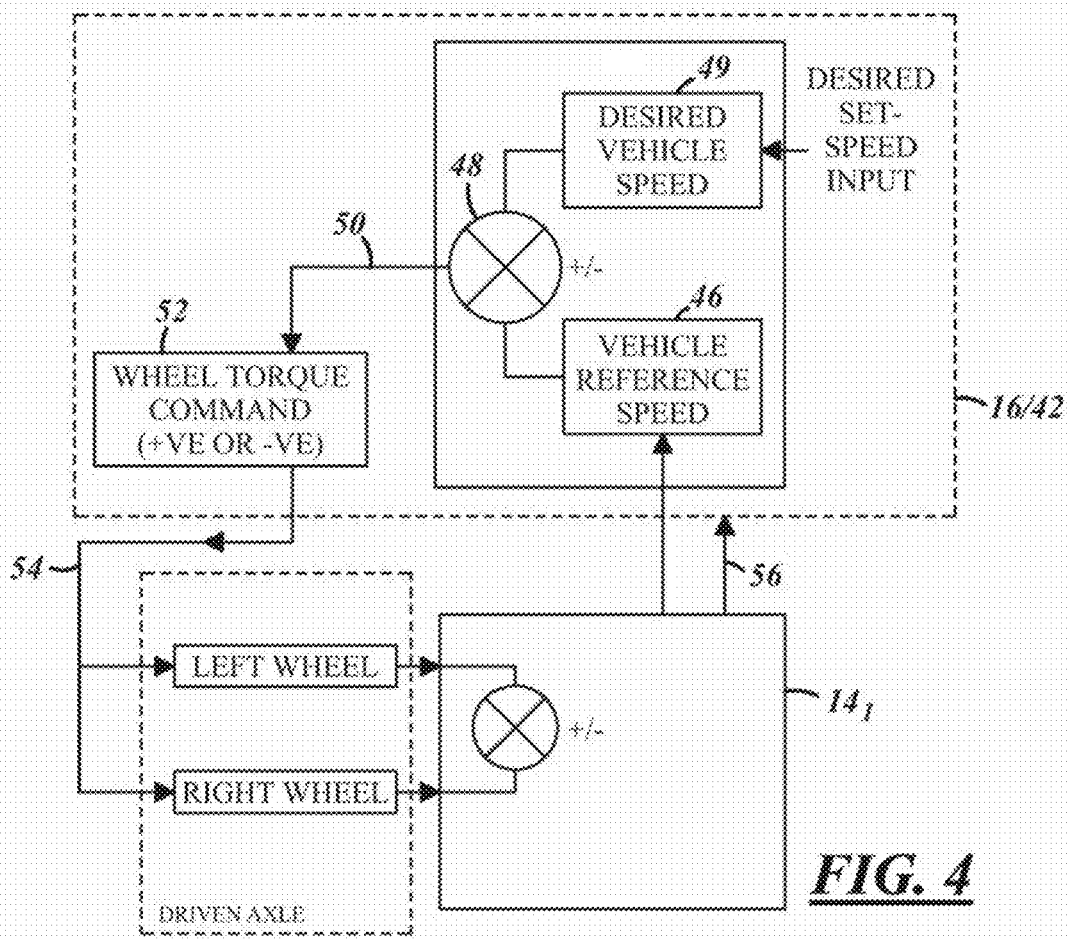
FIG. 4 is a schematic and block diagram illustrating the operation of an example of a speed control system of a vehicle, such as the vehicle illustrated in FIGS. 1 and 2.

More particularly, and with reference to FIG. 4, once the desired set-speed is determined, a vehicle speed sensor (identified as sensor $14_1$ in FIG. 4) associated with the vehicle chassis or driveline provides a signal 46 indicative of vehicle speed to VCU 16. In one embodiment, VCU 16 includes a comparator 48 which compares the desired set-speed (represented with reference numeral 49 in FIG. 4) with the measured speed 46, and provides an output signal 50 indicative of the comparison. The output signal 50 is provided to an evaluator unit 52, which interprets the output signal 50 as either a demand for additional torque to be applied to the vehicle wheels by, for example, powertrain subsystem $12_1$, or for a reduction in torque to be applied to the vehicle wheels, by, for example, brake subsystem $12_3$, depending on whether the vehicle speed needs to be increased or decreased to maintain or achieve the desired set-speed. An output 54 from the evaluator unit 52 is then provided to one or more subsystems 12 so as to manage the torque applied to the wheels, depending on whether there is a positive or negative demand for torque from the evaluator unit 52. In order to initiate the necessary positive or negative torque being applied to the wheels, the evaluator unit 52 may either command that additional power is applied to the vehicle wheels or that a braking force is applied to the vehicle wheels, either or both of which may be used to implement the change in torque that is necessary to achieve or maintain the desired vehicle set-speed. Synchronized application of positive and negative torque to the wheels control the net torque applied thereto, and is commanded by the LSP control system 28 to maintain vehicle stability and composure and regulate torque applied across each axle, in particular in the event of a slip event occurring at one or more wheels. In certain instances, VCU 16 may also receive a signal 56 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event.

In addition to the functionality described above, in one embodiment, LSP control system 28 may be further configured to detect, sense, derive, or otherwise determine information relating to the terrain over which vehicle 10 is travelling (e.g., surface type, terrain classification, terrain or surface roughness, etc.). In accordance with one embodiment, VCU 16 may be configured to perform this function and to do so in a number of ways. One such way is that described in UK Published Application No. GB2492748A published on 16 Jan. 2013, the entire contents of which are incorporated herein by reference. More particularly, in one embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the classification, roughness, etc. of the terrain.

More specifically, in one embodiment, the speed control system (e.g., VCU 16) may include an evaluation means in the form of an estimator module to which the information acquired or received from one or mere sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is travelling over rocky terrain), aerodynamic drag, and lateral vehicle acceleration.

The estimator module also includes a second stage in which the following terrain indicators are calculated: surface roiling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation defection (high frequency, low amplitude vertical wheel excitement indicative of a washboard type surface). The SCS activity signal is derived from several outputs from the ECU of a stability control system (SCS), which contains a dynamic stability control (DSC) function, a terrain control (TC) function, anti-lock braking system (ABS) and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation defection signal.

In one embodiment, and in addition to the estimator module, a road roughness module may also be included for calculating the terrain roughness based on air suspension sensors (the ride height or suspension articulation sensors) and wheel accelerometers. In such an embodiment, a terrain indicator signal in the form of a roughness output signal is output from the road roughness module.

The estimates for the wheel longitudinal slip and the lateral friction estimation may be compared with one another within the estimator module as a plausibility check. Calculations for wheel speed variation and corrugation output, the surface roiling resistance estimation, the wheel longitudinal slip and the corrugation detection, together with the friction plausibility check, are then output from the estimator module and provide terrain indicator output signals, indicative of the nature of the terrain over which the vehicle is travelling, for further processing by VCU 16. For example, the terrain indicators may be used to determine which of a plurality of vehicle subsystem control modes (e.g., terrain modes) is most appropriate based on the indicators of the type of terrain over which the vehicle is travelling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), chassis management subsystem $12_2$, or another suitable component may be appropriately configured to do so, and such other embodiments remain within the spirit and scope of the present invention.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any one particular embodiment or arrangement.

Again, the preceding description of vehicle 10 and the illustrations in FIGS. 1 and 2 are only intended to illustrate one potential vehicle arrangement and to-do so in a general way. Any number of other vehicle arrangements and architectures. Including those that differ significantly from the one shown in FIGS. 1 and 2, may be used instead.

Figure 5:
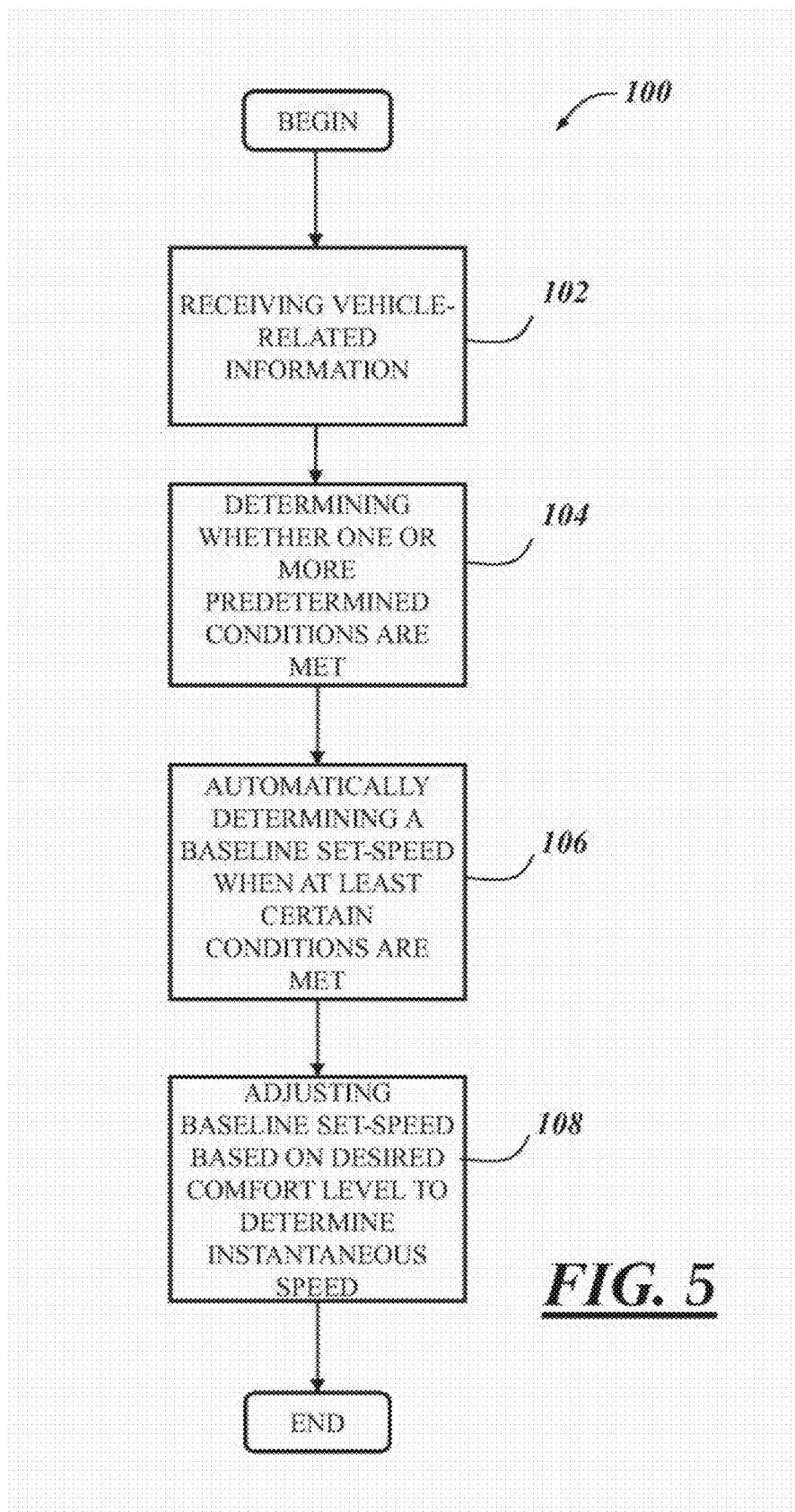
FIG. 5 is a flow diagram of a method for controlling the speed of a vehicle, such as the vehicle illustrated in FIGS. 1 and 2.

Turning now to FIG. 5, there is shown an example of a method 100 for controlling the speed of a vehicle through the operation of a speed control system, For purposes of illustration and clarity, method 100 will be described in the context of vehicle 10 illustrated in FIGS. 1 and 2 and described above, More specifically, method 100 will be described in the context of the low-speed progress (LSP) control system 28 of vehicle 10, which, for purposes of illustration, is integrated in VCU 16 (i.e., VCU 16 comprises ECU 42 of LSP control system 28). It will be appreciated however, that the application of the present methodology is not meant to be limited solely to such an arrangement, but rather method 100 may find application with any number of other speed control system arrangements, including, for example, LSP control systems other than that described above (e.g., not integrated info the VCU of a vehicle, and/or the VCU does not comprise the ECU of the speed control system), as well as, in certain instances, conventional "on-highway" cruise control systems, such as, for example, cruise control system 26 described above. Accordingly, the present invention is not meant to be limited to any one particular arrangement or type of speed control system. Additionally, it will be appreciated that the performance of method 100 is not meant to be limited to any one particular order or sequence of steps.

In an embodiment, the speed control methodology of method 100 is provided for the intended purpose of enhancing the comfort of the vehicle occupants) and/or the composure of the vehicle as the vehicle progresses, in view of this, the speed control system setting or feature embodied by method 100 may be considered, and may be referred to below as, a "comfort/composure setting." In an embodiment, this setting is active whenever the speed control system is active and may not be deactivated by a user, in other embodiments, however, the setting may be selectively activated or deactivated by a user such that the user can decide whether or not to allow for the vehicle speed to be controlled in the manner described below. In the latter instance, the user may activate or deactivate the comfort/composure setting (and, therefore, method 100) by manipulating one or more user interface devices, such as, for example, one or more of user interfaces 44 described above, and/or doing so in a particular way. Additionally, and as will be apparent in view of the description below, in certain embodiments, the comfort/composure setting may include one or more modes in which it may operate when active, and may be an adjustable setting such that the degree or level of comfort may be increased or decreased based on, for example, a user's preference or other conditions relating to the operation of the vehicle (e.g., number and location of occupants)

In an embodiment, method 100 comprises a step 102 of receiving one or more electrical signals representative of vehicle-related information. The electrical signals, which may originate from any number of sources, including, but not limited to, one or more of vehicle sensors 14, one or more of vehicle subsystems 12, one or more memory devices (e.g., memory device 22 of VCU 16), or any other suitable or appropriate device or component of vehicle 10, may represent any number of types of information related to the vehicle.

One type of information may be the type of terrain over which the vehicle is travelling (e.g., snow, water, sand, gravel, boulders, mud, grass, etc.), and/or one or more characteristics of that terrain (e.g., roughness), in an embodiment, VCU 16 may receive electrical signals representative of this information from another subsystem or component of the vehicle. For example, the appropriate vehicle subsystem 12 may be queried and the appropriate terrain information (e.g., type, characteristic(s), etc.) received therefrom, in another embodiment, this information may already be stored in a memory device of or accessible by the component or device configured to perform method 100, and thus, the information may be received from that memory device. For example, in an instance wherein VCU 16 is configured to perform at least certain steps of method 100, the information may be stored in memory device 22 of VCU 16, and thus, processing device 24 of VCU 16 may receive the information from memory device 22.

Another type of information may be that needed to determine, detect, or sense the type and/or one or more characteristics of the terrain over which the vehicle is travailing (also referred to as the "prevailing terrain"). For example, electrical signals representative of information relating to a variety of operational or operating parameters of vehicle 10 may be received from one or more vehicle sensors 14 and/or one or more subsystems 12, including, for example, those described above with respect to the illustrative process for determining terrain type and/or characteristics thereof. The received information may then be evaluated and used in, for example, the manner described above, to determine the desired terrain-related information. For example, in an embodiment wherein VCU 16 is configured to perform at least certain steps of method 100, VCU 16 may receive electrical signals representative of information relating to a variety of operational or operating parameters of the vehicle 10 from one or more vehicle sensors 14 and/or one or more subsystems 12, including, for example, those described above with respect to the illustrative process for determining terrain type and/or characteristics thereof. VCU 16 may then evaluate and use the received information in, for example, the manner described above to determine the desired terrain-related information.

Similar to the above, yet another type of information may be that related to one or more operational or operating parameters of the vehicle, and may include, but is not limited to, that information used to determine or derive the terrain-related information described above. This information may include, for example, that related to one or more of: wheel slip; wheel articulation; ride height; tyre pressure; vehicle attitude (e.g., pitch, yaw, and roil of the body of the vehicle); tyre drag; tyre friction; the frequency and/or amplitude of vibrations in or of the body of the vehicle; steering wheel angle; steerable road wheel angle and/or a rate of change thereof; lateral acceleration of the vehicle; terrain response (TR) mode; rolling resistance; gear selection; and/or other parameters influencing vehicle body movement, to cite a few possibilities. Electrical signals representative of one or more operational parameters of vehicle 10 may be received from one or more vehicle sensors 14 and/or one or more subsystems 12, including, but not limited to, those described above, or from, another appropriate component of vehicle 10. For example, in an embodiment wherein VCU 16 is configured to perform at least certain steps of method 100, VCU 16 may receive electrical signals representative of one or more operational parameters of vehicle 10 from one or more vehicle sensors 14 and/or one or more subsystems 12, including, but not limited to, those described above, or from another appropriate component of the vehicle 10.

Vet still another type of information is that related to the occupancy of the vehicle. This information may include, for example, the identity of the user (i.e., driver) of the vehicle. For example, in an embodiment, the identity of the user may be determined based on, for example, the seat adjustment position of the driver seat that has been associated with a particular user, a specific key fob identity, a user-specific identifier that may be provided by the user through the manipulation of one or more user interface devices (e.g., user interfaces 44), or using other known techniques. Accordingly, in an embodiment wherein VCU 16 is configured to perform at least certain steps of method 100, VCU 16 may receive electrical signals representative of the identity of the driver from one or more vehicle sensors 14 and/or one or more subsystems 12, including, but not limited to, those described above, from one or more user interface devices 44, and/or from some other appropriately configured component or device of vehicle 10.

Figure 6:
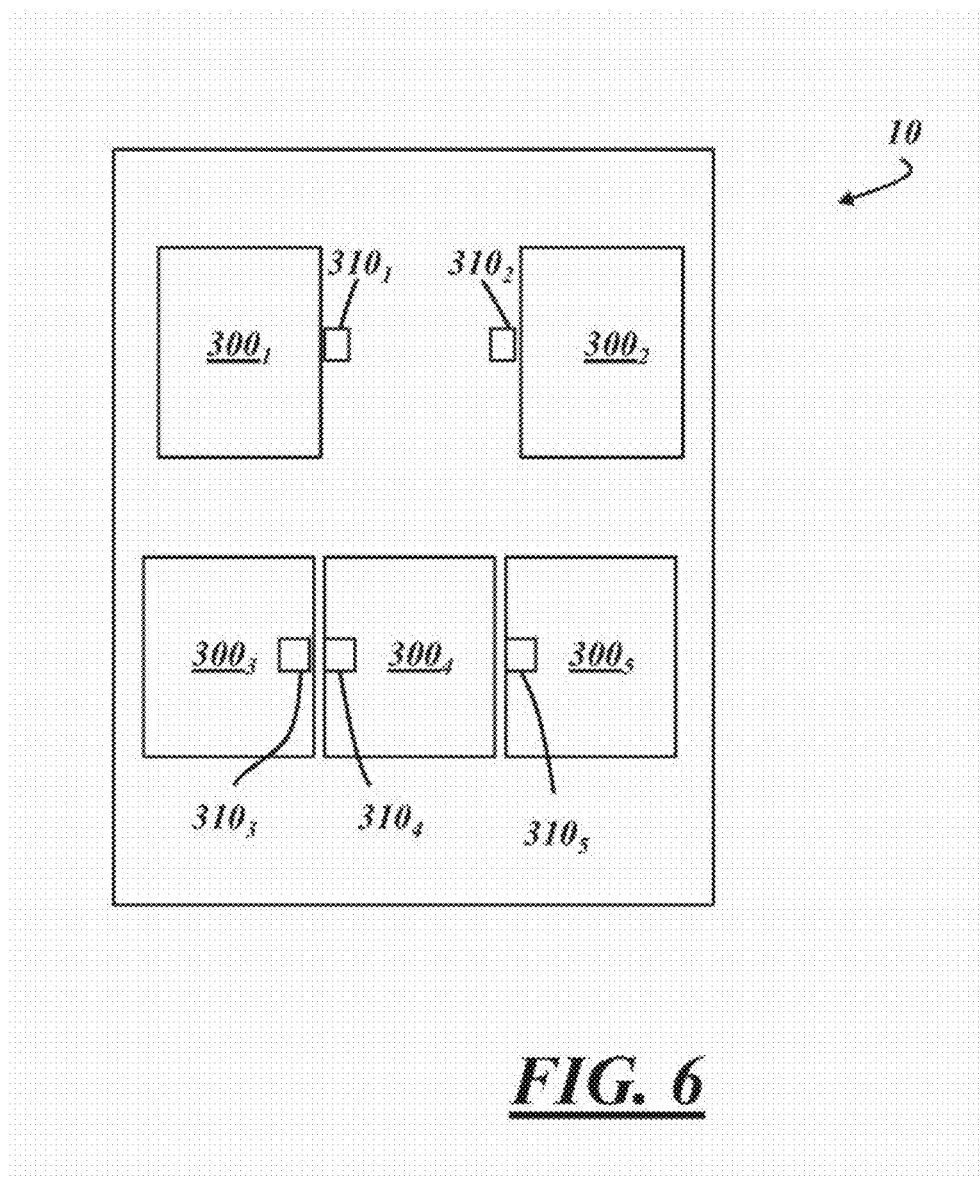
FIG. 6 is a plan view of a cabin of a vehicle, such as the vehicle illustrated in FIG. 1.

Occupancy-related information may also include the number of occupants of the vehicle and/or the particular locations of the occupants within the vehicle (e.g., which seats of the vehicle are occupied—driver seat, front passenger seat, driver side rear passenger seat, passenger side rear passenger seat, and center rear seat). It will be appreciated that for vehicles where more than two rows of seats are provided, the occupancy status of additional seating positions may also be monitored. Electrical signals representative of this information may be received directly from, for example, one or more vehicle sensors 14 (e.g., occupancy sensors) associated with the seats of the vehicle. More particularly, and as shown in FIG. 6, vehicle 10 may include a plurality of seats 300 (e.g., 300$_1$, 300$_2$, 300$_3$, 300$_4$, and 300$_5$ in FIG. 6), and each seat may have a sensor associated therewith. The sensors may be disposed within the seats themselves or, as illustrated in FIG. 6 the sensors, which in an embodiment may be in the form of switches 310 (e.g., 310$_1$, 310$_2$, 310$_3$, 310$_4$, and 310$_5$) may be embedded in the seat buckles of each seat. Each sensor may be configured to detect when the seat corresponding thereto is occupied. In addition, or alternatively, vehicle 10 may also include one or more cameras (e.g., infrared, invisible light, etc.) configured to observe the inferior of the vehicle cabin. Further, in an embodiment, information relating to the number and location of vehicle occupants may be provided by a user of the vehicle through the manipulation of one or mere user interface devices (e.g., user interface devices 44). In each of these embodiments, and in an instance wherein VCU 16 is configured to perform at least certain steps of method 100, VCU 16 may receive electrical signals from the occupancy sensors, cameras, and/or user interface devices representative of the occupancy of the vehicle and to determine therefrom the number of vehicle occupants, as well as which seats are occupied by those occupants. In another embodiment, a subsystem 12 may receive the electrical signals from the occupancy sensors, cameras, and/or user interface devices and then use those signals to determine the occupancy of the vehicle. In such an embodiment, VCU 16, for example, may query that subsystem and receive the appropriate occupancy information therefrom, in another embodiment, this information may already be stored in a memory device oh or accessible by, the component or device configured to perform method 100, and thus, the information may be received from that memory device. For example, in an instance wherein VCU 16 is configured to perform at least certain steps of method 100, the information may be stored in memory device 22 of VCU 16, and thus, processing device 24 of VCU 16 may receive the information from memory device 22.

While only certain types of information have been explicitly described above, it will be appreciated that the present invention is certainly not meant to be limited to only those types of information. Rather, information in addition to or instead of that described above may also be acquired or received and used in the same manner as that described in greater detail below. Accordingly, the present invention is not limited to any one or more particular type(s) of information. Additionally, while the description above has been primarily with respect to VCU 16 performing step 102, it will be appreciated that in other embodiments, components of vehicle 10 other than VCU 16 may be configured to perform this step.

As illustrated in FIG. 5, method 100 further comprises a step 104 of determining, based at least in part on the vehicle-related information received in step 102, whether one or more predetermined conditions relating to the vehicle or the operation thereof are met. The predetermined conditions may comprise any number of conditions that may relate to various aspects of the vehicle and/or the operation thereof, and that also pertain, at least to a certain degree, to either vehicle composure and/or vehicle occupant comfort. While certain conditions are described with particularity below, it will be appreciated that the present invention is not limited to those conditions; rather, conditions in addition to or instead of those described below may also be evaluated and used as described herein.

In an embodiment, one or more of these conditions may relate to the type or classification of the terrain the vehicle is currently traversing, i.e., the prevailing terrain. More particularly, one condition may be that the terrain the vehicle is currently traversing is of a particular type or classification. A reason that it may be desirable to take terrain type/classification into account is that different terrains may affect vehicle composure, and thus, occupant comfort differently. For example, a boulder Held will affect both vehicle composure and occupant comfort differently than say a relatively flat stretch of sand. Similarly, the confidence of a vehicle driver to negotiate the terrain may be lower when traversing a boulder field than it would be when traversing a fiat stretch of sand. In an embodiment wherein terrain type is taken into consideration, a determination is first made as to the type of terrain the vehicle is currently traversing baaed at least in part on the information received in step 102. In an embodiment, the terrain type may be obtained or acquired directly from the information received in step 102 (i.e., the information may be an identification of the terrain type). In another embodiment, however, the terrain type may be obtained or acquired indirectly in that it must be derived from the received information (i.e., the received information may be used to determine the terrain type using, for example, the techniques described elsewhere above). In either instance, if the prevailing terrain matches that of the condition being evaluated, it can be determined that the condition is met. If, however, the prevailing terrain does not match that of the evaluated condition, it can be determined that the condition is not met. For example. If the condition being evaluated is that the terrain is sand, and it is determined from the information received in step 102 that the prevailing terrain is something other than sand, it will be determined that the condition is not met. Accordingly, in an embodiment, step 104 may comprise determining the type of terrain the vehicle is traversing, and then determining if any conditions rotating to the particular type of terrain are met.

Another condition may relate to one or more particular characteristics of the prevailing terrain, such as, for example, the roughness, incline/decline, or any other characteristic of the terrain. More particularly, one condition may be that the prevailing terrain has a particular characteristic. For purposes of illustration only, the description below will be with respect to an embodiment wherein the characteristic of interest is terrain roughness. It will be appreciated, however, that the description below would apply with equal weight to any other terrain characteristics, and thus, the present invention is not meant to be limited to any one particular characteristic. Accordingly, in an embodiment, one condition evaluated in step 104 may be that the prevailing terrain has a particular roughness. As with the condition relating to terrain type described above, a reason that it may be desirable to take certain characteristics of the terrain into account is that different characteristics of a given terrain may affect vehicle composure and/or occupant comfort differently. For example, a given terrain that has an extremely rough surface will affect both vehicle composure and occupant comfort differently that than that same type of terrain having a smooth surface. Similarly, the confidence of a vehicle driver to negotiate the terrain may be lower when the terrain surface is rougher than it would be when the surface is smooth. In an embodiment wherein the surface roughness of the terrain is taken into account, a determination is first made as to the roughness of the prevailing terrain based at least in part on the information received in step 102. in an embodiment, the terrain roughness may be obtained or acquired directly from the information received in step 102 (i.e., the information may be an identification of the roughness). In another embodiment, however, the terrain roughness may be obtained or acquired indirectly in that if must be derived from the received information (i.e., the received information may be used to determine the roughness using, for example, the techniques described elsewhere above). In either instance, if the roughness of the prevailing terrain matches that of the condition being evaluated, it can be determined that the condition is met. If, however, the roughness of the prevailing terrain does not match that of the evaluated condition, it can be determined that the condition is not met, For example, if the condition being evaluated is that the terrain is extremely rough, and it is determined from the information received in step 102 that the prevailing terrain is smooth, it will be determined that the condition is not met. Accordingly, in an embodiment, step 104 may comprise determining a particular characteristic of the terrain the vehicle is traversing, and then determining if any conditions relating to that particular characteristic are met.

Other conditions may relate specifically to one or more operational or operating parameters of the vehicle, and in an embodiment, those parameters relating to the attitude and/or movement of the body of the vehicle, in particular. A multitude of conditions relating to any number of vehicle operating parameters may be used; however, in the interest of brevity, and for purposes of illustration only, a select few operating parameter-based conditions will be described below. It will be appreciated though, that while only certain conditions are described here in detail, the present invention is not limited to any particular operating parameter-based conditions, but rather any number of other conditions may be used in addition to, or instead of, those described below. Regardless of the operating parameter being evaluated or monitored a reason that it may be desirable to take operating parameters of the vehicle into account is that they are directly related to vehicle attitude and vehicle body movement, and therefore, vehicle composure, which, in at least certain instances, directly affects occupant comfort. For example, if the operating parameter relates to the roil of the vehicle body about its longitudinal axis, a greater roil angle may have a much greater influence on occupant comfort and the confidence of the user to control the vehicle than a much smaller roll angle.

One condition that may be monitored and evaluated relates to the vibration or excitation of the vehicle body. More particularly, a condition may be that one or both of the amplitude and frequency of a vibration in the vehicle body, or a particular component thereof, exceed(s) a respective predetermined threshold value, which may be derived and programmed into a memory device of vehicle 10 (e.g., memory 22 of VCU 16) during the design, manufacture, or installation of vehicle 10 or a component thereof, and/or during the operation of the vehicle. In such an embodiment, a determination is first made as to the existing or current vibration amplitude and/or frequency of the vehicle body based at least in part on the information received in step 102 and using techniques well known in the art. This may be done by monitoring the electrical signal(s) received in step 102 that correspond to the vibration amplitude and/or frequency of the vehicle body. Depending on the implementation one or both of the amplitude and frequency signals are then compared to the respective threshold values, if one or both of the vibration amplitude and frequency exceeds (or, in certain embodiments, meets or exceeds) the threshold value corresponding thereto, it can be determined that the condition relating to that component of the vibration is met. If, however, one or both of the amplitude and frequency falls below (or, in certain embodiments, meets or falls below) the threshold value corresponding thereto, it can be determined that the condition is not met. Accordingly, in an embodiment, step 104 may comprise determining one more components of a vibration in or on the vehicle body, and then determining if a condition relating thereto is met.

Another condition that may be monitored and evaluated relates to the attitude of the vehicle body. More particularly, one condition may be that the roil angle of the vehicle body about its longitudinal axis (i.e., the tilting of the vehicle body) is approaching or exceeds a predetermined threshold value, which may be derived or defined and programmed into a memory device of vehicle 10 (e.g., memory 22 of VCU 16) during the design, manufacture, and/or installation of vehicle or a component thereof, and/or during the operation of the vehicle, in such an embodiment, a determination is first made as to the existing or current roll angle of the vehicle body based at least in part on the information received in step 102 and using techniques well known in the art. This may be done by monitoring the electrical signal(s) received in step 102 that correspond to the roll angle of the vehicle body. The current roll angle or electrical signal representative thereof is then compared to the predetermined threshold value and if it exceeds (or, in certain embodiments, meats or exceeds) the threshold value, it can be determined that the condition relating to the roll of the vehicle body is met. If, however, the current roll angle falls below (or, in certain embodiments, meets or falls below) the threshold value, it can be determined that the condition is not met. For example, if vehicle 10 is travelling across (as opposed to directly up or down) an incline, the vehicle body will be caused to tilt or roll about its longitudinal axis. Using information from, for example, one or more vehicle sensors 14 (e.g., gyro sensors) and/or subsystems 12 (e.g., chassis management subsystem 12$_2$) and techniques well known in the art, the roll angle of the vehicle body can be determined and then compared to a predetermined threshold value. Depending on whether the roil angle exceeds or falls below the threshold value, a determination can be made as to whether a condition relating vehicle body roll angle is met Accordingly, in an embodiment, step 104 may comprise determining the roll angle of the vehicle body, and then determining if a condition relating thereto is met. While roll angle is specifically described above, it will be appreciated that any other parameter relating to the attitude of the vehicle may be evaluated or used in the same or similar manner including, for example, the pitch, yaw, lateral and/or vertical acceleration of the vehicle or vehicle body, to name a few possibilities.

Yet still other conditions that may be evaluated relate to the occupancy of the vehicle. One such condition may be that the vehicle is being driven/operated by a particular individual. A reason that it may be desirable to take the identity of the vehicle user into account is that different users may prefer different speeds when certain vehicle and/or terrain-related conditions are encountered. For example, a driver having more experience operating the vehicle over particularly rough terrain may be more confident and comfortable negotiating that terrain at a higher speed than a leaser-experienced user would, and thus, the less experienced user may prefer a lower speed than a more experienced user would. In an embodiment wherein the identify of the user is taken into account, the user's identity is first detected based at least in part on the Information received in step 102 and in the manner described elsewhere above. If the identify of the user matches that of the condition being evaluated, it can be determined that the condition is met, if, however, the identity of the user is does not match that of the evaluated condition, it can be determined that the condition is not met. Accordingly, in an embodiment, step 104 may comprise determining the identify of the user, and then determining if any driver-related conditions are met.

Another occupancy-based condition may be that the vehicle is occupied by a certain number of people, in an embodiment, the same or a different condition may relate to the particular locations (i.e., seats) occupied by the occupants of the vehicle. A reason that it may be desirable to take the number and corresponding locations of the vehicle occupants info account is that an occupant located at one location of the vehicle (e.g., passenger seat) may have a different level of comfort than an occupant located at another location of the vehicle (e.g., driver seat) when certain vehicle- and/or terrain-related conditions are encountered, More particularly, when a user is operating the vehicle with no passengers, he may opt to accept less vehicle composure in order to drive the vehicle at a faster speed. As the user is in control of the vehicle, the movement of the vehicle is likely to be perceived by the user as being consistent with his expectations, and therefore, acceptable. Furthermore, the user may be able to steady or brace himself against, for example, a steering wheel and therefore may be able to tolerate more vehicle body movement than a passenger might be comfortable with. A passenger, who is not in control of the vehicle, may perceive the same vehicle movement or vibration as being unacceptably uncomfortable. It will also be appreciated, that depending on the direction of vehicle body roll, a passenger (as opposed to the driver) may be supported by an adjacent supporting surface such as a door or armrest, or alternatively may find themselves relying on inferior-mounted grab handles and the like for support. In this way, a passenger may foe more sensitive to vehicular body roll angle depending on the direction of that roll angle, left or right. In addition, it will also be appreciated that the vehicular response to varied terrain may also vary in dependence on the loading of the vehicle. A vehicle travelling with a lone driver and little or no additional vehicle payload is likely to be perceived by the driver as having a firmer ride than when the vehicle is driven folly loaded. By measuring vehicle parameters such as ride height, vehicle attitude, and occupancy, the VCU 16 may compensate for variation in vehicle loading, mitigating the influence of vehicle loading on vehicle ride quality when driving over varied terrain. In an embodiment wherein the number, and in at least certain instances, the particular location(s) occupied by the vehicle occupant(s) are taken info account, this occupancy information is first defected based at least in part on the information received in step 102 using, for example, the techniques described elsewhere above. In an instance wherein the condition is that the vehicle is occupied by at least a certain number of occupants, if the defected number of occupants matches that of the condition being evaluated, it can be determined that the condition is met. If, however, the detected number of occupants does not match that of the evaluated condition, it can foe determined that the condition is not met. Similarly, in an instance wherein a condition is that certain seats within the vehicle are occupied, if the detected occupant locations match that of the condition being evaluated, it can foe determined that the condition is met. If, however, the detected occupant locations do not match that of the evaluated condition. It can be determined that the condition is not met. Accordingly, in an embodiment, step 104 may comprise determining the number and/or locations of vehicle occupants, and then determining if any occupant related conditions are met.

While only certain types of conditions have been explicitly described above, it will be appreciated that the present invention is certainly not meant to be limited to those particular conditions. Rather, conditions in addition to or instead of those described above, such as, for example, conditions relating to vehicle configuration (e.g., ride height, gear ratio of the vehicle driveline (e.g., PTU or transmission), tyre pressure, the particular mode in which the vehicle is operating (e.g., terrain mode), etc.), may also be evaluated and used in the same or similar manner as that described above and/or below. Accordingly, the present invention is not limited to any one or more particular conditions. Additionally, while various conditions have been described individually above, in practice, and as will be appreciated in view of the description below, two or more conditions may be evaluated together or in combination with each ether for the purposes described herein. In an embodiment, step 104 may be performed by VCU 16 or another suitable component of vehicle 10.

With continued reference to FIG. 5, in an embodiment method 100 further comprises a step 106 of automatically determining or identifying a baseline set-speed of the vehicle, and the speed control system thereof, in particular, when it is determined that at least certain of the conditions evaluated in step 104 are met. The baseline set-speed is the set-speed that the speed control system determines the set-speed of the vehicle should be when the relevant condition(s) are met, in certain embodiments, the baseline set-speed may be a maximum set-speed of the speed control system in view of the prevailing conditions.

In an embodiment, the baseline set-speed may be acquired from a memory device of vehicle 10, such as, for example, memory 22 of VCU 16 or another suitable memory device. The memory device may have one or more predefined baseline set-speeds stored therein from which the baseline set-speed may be selected. Each predefined baseline set-speed is associated or correlated in the memory device with one or more vehicle-related conditions or parameters relating thereto, including, but not limited to, one or more of those conditions described above. The individual set-speeds that make up the predefined set-speeds may be derived or defined in one or a combination of ways, including, but not limited to, those described below.

In one example, some or ail of the baseline set-speeds may be defined during the design, manufacture, and/or installation of the vehicle and/or a component thereof, and may be programmed or stored in a memory device (e.g., memory device 22 or another suitable memory device) prior to the vehicle being sent to a customer. More specifically, as part of the design, manufacture, and/or installation of the vehicle, a baseline set-speed may be defined for each or a combination of vehicle-related conditions that may be evaluated during operation of the speed control system and the comfort/composure setting or feature thereof, in particular, including, but certainly not limited to, one or more of those described above. For instance, and without limitation, set-speeds may be defined for one or more terrain types/classifications, one or more terrain characteristics, one or more vehicle roll angles, one or more particular users or different vehicle occupancies, or a combination of the above conditions. The predefined set-speeds may be vehicle type-dependent in that they may be specifically tailored to a particular type (e.g., make or model) of vehicle, or may be vehicle type-independent in that they may be the same regardless of the type of vehicle. In an embodiment, at least some of the set-speeds stored in the memory device may be factory or manufacture-defined set-speeds.

In another example, some or all of the predefined baseline set-speeds may be defined by the user of the vehicle. One way this may be done is that a user may be permitted to manually define set-speeds using, for example, one or more user interface devices prior to or during the operation of the vehicle. Mere particularly, the user may know particular baseline set-speeds he wants to program into the speed control system for one or more particular vehicle-related conditions, and he may do so by manipulating any suitable and appropriately configured user interface device in a predetermined or prescribed way. In accordance with one embodiment, one or more user interlace devices 44 may be appropriately configured to allow the user to define one or more set-speeds. For example, baseline set-speeds may be defined by manipulating one or a combination of user input devices $40_1$-$40_5$ in a particular or prescribed manner that will indicate to VCU 16 that the user wishes to define a baseline set-speed and what that set-speed is (e.g., manipulating a particular device and/or in a particular way (e.g., pressing a button a certain number of times, for a particular length of time, or in accordance with a particular pattern), manipulating a combination of devices in a particular order or in a particular way, etc.). Alternatively, a user input device in the form of a touch screen or display device configured to display one or more user-inputtable or user-selectable fields may be used. In an embodiment, a user may be able to scroll through or select each condition that the speed control system takes into account in determining a baseline set-speed, and may be able to define a baseline set-speed for one or all of those conditions. Accordingly, it will be appreciated that the present invention is not meant to be limited to any one particular technique for the manual entry of set-speeds by a user.

A user may also be able to define set-speeds in real-time while the vehicle is moving or travelling. For instance, if, as the vehicle is travelling, the user finds a speed he likes, he may define that speed as a baseline set-speed. As with the example above, this may be done by manipulating one or more user interface devices, such as those described above, thereby indicating that the current speed should be saved as a baseline set-speed. For example, in one embodiment, when the vehicle reaches a speed the user likes, he may manipulate one or more user interfaces 44, and/or may do so in a particular way (e.g., manipulating a particular device and/or in a particular way (e.g., pressing a button a certain number of times, for a particular length of time, or in accordance with a particular pattern), manipulating a combination of devices in a particular order or in a particular way, etc.) to indicate to the speed control system that the user wishes to define the current speed as a baseline set-speed, in response, the speed control system is configured to read the current speed and define and save it in the memory device as a baseline set-speed. Alternatively, in certain instances, the vehicle may be configured to allow the user to define a baseline set-speed in ways other than using user input devices of the speed control system. For example, set-speeds may be defined by manipulating one or both of the accelerator and brake pedals of the vehicle in the same or similar manner as that described in detail in GB Patent Application GB1214651.0, filed 16 Aug. 2012, the entire contents of which are incorporated by reference. To summarize however, the vehicle may be configured such that a baseline set-speed may be defined by a light tapping or pressing of the accelerator and/or brake pedal in a way that will not override or cancel the LSP control system 28. In such an embodiment, the speed control system (e.g., VCU 16) is configured to monitor pedal input signals from the accelerator and brake pedals (e.g., pedals 18, 20), and if the amount of pedal travel meets a predetermined threshold distance or is within a prescribed range of travel, or alternatively, if the amount of pressure applied to the pedal meets certain threshold or is within a prescribed range, the speed control system is configured to read the current speed and define and save it as baseline set-speed. Accordingly, in view of the above, it will be appreciated that any number of techniques, including but not limited to, these described above, may be used to allow a user to define one or more baseline set-speeds, and the present invention is not limited to any particular one.

Regardless of the particular way in which a user indicates to the speed control system that he wishes to define the current speed as a baseline set-speed, when the defined set-speed is read and stored in the memory device, it is associated and stored along with certain vehicle-related information that pertains to one or more vehicle-related conditions, such as, for example, those described above, that may be evaluated during operation of the speed control system and the comfort/composure setting or feature thereof, in particular. For instance, when a user defines a baseline set-speed, certain vehicle-related information that corresponds to the particular time at which the set-speed was defined or selected is recorded and associated in the memory device with that particular baseline set-speed. This information may comprise, for example, the type and/or characteristic(s) of the terrain the vehicle is or was traversing when the set-speed was defined, a value for each of one or more operational parameters of the vehicle (e.g., roll angle of the vehicle body, vibration amplitude and/or frequency, etc.), vehicle configuration (e.g., ride height, tyre pressure, etc), and occupancy information (e.g., identity of the user, number and location of occupants, etc.), to cite a few possibilities.

In addition to, or instead of, those ways described above, in one embodiment baseline set-speeds may also be automatically defined by the speed control system itself. One way in which this may be done is that each time the set-speed of the vehicle is adjusted (i.e., the user requests that the set-speed be incrementally adjusted (e.g., 1 mph or 1 kph increments)), the speed control system may define and save it as a baseline set-speed, Accordingly, if a vehicle is travelling at 5 mph (approximately 8 kph) and the driver adjusts the speed to 7 mph (approximately 11 kph), the control system will save 5 mph (8 kph) as a predefined baseline set-speed, and may also set the new speed (7 mph (11 kph)) as another baseline set-speed. An additional or alternative way in which baseline set-speeds may be automatically defined is that when the vehicle travels at a given speed for a prescribed of amount of time or distance without adjustment, the system may save that speed as a baseline set-speed. Accordingly, in view of the above, it will be appreciated that any number of techniques, including but not limited to, those described above, may be used to automatically define baseline set-speeds, aid the present invention is not limited to any particular technique. For example, and as with the user-defined baseline set-speeds described above, when the defined baseline set-speed is read and stored in the memory device, it is associated and stored along with certain vehicle-related information that pertains to one or more vehicle-related conditions, such as, for example, those described above, that may be evaluated during operation of the speed control system and the comfort/composure setting or feature thereof, in particular. This may be done in the same manner as that described above, and thus, it will not be repeated here, but rather the description above is incorporated here by reference.

In each of the embodiments described above, the vehicle-related information that is associated and stored along with the predefined baseline set-speeds in the memory device may be acquired in a number of ways. One way is that the speed control system (e.g., VCU 16) may acquire it from another subsystem or component of the vehicle. For example, each time a baseline set-speed is defined, the component or device performing at least certain steps of method 100 (e.g., VCU 16) may query the appropriate subsystem 12 to acquire the appropriate terrain information. Another way is that the speed control system may be configured to detect, sense, derive, or otherwise determine the terrain-related information itself using, for example, information received from one or more vehicle sensors (e.g., sensors 14), one or more vehicle subsystems (e.g., subsystems 12), or any other suitable component of vehicle 10.

In embodiments wherein the predefined set-speeds may include factory- or manufacturer-defined baseline set-speeds, as well as user- and/or system-defined baseline set-speeds, when a baseline set-speed is defined by the user or automatically by the speed control system: for a particular condition or combination of conditions, that user- or system-defined set-speed may overwrite the manufacturer-defined baseline set-speed for that or those particular condition(s). In another embodiment, however, the comfort/composure setting or feature may be operable in two different modes—one in which manufacturer-defined baseline set-speeds are used, and another in which user- or system-defined baseline set-speeds are used. In such an embodiment, the user may be able to select which mode of operation is desired using, for example, one or more user interface devices (e.g., user interface devices 44), For example, the user may not be the normal driver of that particular vehicle, and thus, may want to use manufacturer-defined baseline set-speeds that may be more conservative or less aggressive than those that may have been defined by another person. In such an embodiment, the manufacturer-defined baseline set-speeds are not overwritten by a subsequent user-defined set-speed, out rather both may be associated with the corresponding condition(s) and their use dictated by the particular mode in which the speed control system, and the comfort/composure setting thereof, in particular, is operated.

In an embodiment, VCU 16 of vehicle 10 is configured to perform the functionality described above relating to the defining of baseline set-speeds, it will be appreciated, however, that in other embodiments, this functionality may be performed by another suitable component of vehicle 10.

Turning back to step 106, as briefly mentioned above, Step 106 comprises automatically determining or selecting a baseline set-speed of the vehicle when it is determined that at least certain of the one or more vehicle-related conditions evaluated in step 104 are met. The certain conditions that must be met may comprise ail of the conditions that are evaluated in step 104 or a subset of those conditions, which, in turn, may comprise a combination of two or more of the evaluated conditions or a single one of the conditions, depending on the particular implementation. Once if is determined that the requisite conditions have been met, the baseline set-speed of the speed control system may be determined that corresponds to that or those vehicle-related conditions, in an embodiment wherein a plurality of pre-defined baseline set-speeds are stored in the memory device, step 106 may comprise the sub-step of selecting a particular baseline set-speed from among the plurality of predefined baseline set-speeds. As described above, the determined baseline set-speed may be one of a factory- or manufacturer-defined set-speed, or a user-defined set-speed, in embodiments wherein both types of predefined baseline set-speeds are stored in the memory device, the particular mode of operation of the comfort/composure setting or feature will dictate which type of set-speeds (i.e., user- or manufacturer-defined set-speeds) are used in step 106. The determination made in step 106 may be done so using one or more appropriately configured data structures (e.g., one- or multi-dimensional look-up tables, predefined profiles, etc.) stored in a memory device of vehicle 10 (e.g., memory device 22 of VCU 16). In such an embodiment, one or more look-up tables or predefined profiles that correlate one or more of the evaluated condition(s) with baseline set-speeds (which, as described above, may be manufacturer-defined and/or user-defined set-speeds) may be utilized to determine the baseline set-speed.

For example, assume that the terrain the vehicle is traversing is a boulder field. Assume further that at least one of the conditions that will trigger an automatic determination of a baseline set-speed in step 106 is that the vehicle is traversing a boulder field. When it is determined in step 104 that this condition is met, step 106 will comprise determining the baseline set-speed that corresponds to the prevailing terrain being a boulder field. This may comprise, for example, looking up "boulder field" in an appropriately configured look-up table that correlates terrain type with set-speed baselines to determine the baseline set-speed for that particular terrain type.

In another example, assume that the terrain the vehicle is traversing is extremely rough. Assume further that at least one of the conditions that will trigger an automatic determination of a baseline set-speed in step 106 is that the terrain the vehicle is traversing is the same as the prevailing terrain roughness—i.e., extremely rough. When it is determined in step 104 that this condition is met, step 106 will comprise determining the baseline set-speed that corresponds to a terrain roughness that is the same as that of the prevailing terrain. This may comprise, for example, looking up "extremely rough" in an appropriately configured look-up table that correlates terrain roughness with set-speed baselines to determine the baseline set-speed for that particular terrain surface roughness.

In yet another example, assume that the current roll angle of the vehicle is 14°. Assume further that at least one of the conditions that will trigger an automatic determination of a baseline set-speed in step 106 is that the roll angle of the vehicle is in the range of 11-15°. When it determined in step 104 that this condition is met, step 106 will comprise determining the baseline set-speed that corresponds to the roll angle of the vehicle being within 11-15°. This may comprise, for example, looking up "14°" in an appropriately configured look-up table that correlates roll angle with set-speed baselines to determine the baseline set-speed for that particular roll angle, or determining which of one or more predetermined ranges the roll angle falls within (e.g., 0-5°, 6-10°, 11-15°, etc.) and then looking up that particular range in an appropriately configured look-up table In certain instances, multiple conditions may be evaluated. For example, assume that the vehicle has two occupants (the user or driver and a passenger in the front passenger seat) and that the roll angle of the vehicle body is 9° such that the passenger is lifted above the driver (i.e., the driver is sitting in the downslope seating position), and therefore, the perceived comfort of the passenger may be adversely affected (i.e., as a result of the magnitude and direction of the roll angle, the passenger may have a tendency to lean toward the driver and may need to steady himself by grasping the interior grab handle or other suitable structure, whereas the driver may be supported by, for example, the inside of the driver side door). Assume further the automatic determination of a baseline set-speed in step 106 will be triggered when both the vehicle is occupied by a driver and a passenger located in the front passenger seat and the vehicle has a roll angle of 5-10° in the direction towards the driver side of the vehicle and away from the passenger side (i.e., the passengers position is lifted above the driver's position). When it is determined in step 104 that both of these conditions are met, step 106 will comprise determining a baseline set-speed that corresponds to that particular combination of conditions. This may comprise, for example, looking up "two occupants—driver and front passenger" and "9°" in an appropriately configured look-up table that correlates both the number and location of occupants and roll angle with set-speed baselines to determine the baseline set-speed for the given scenario. Alternatively, rather than looking up the particular angle, a determination may be made as to which of one or mere predetermined ranges the roll angle falls within (e.g., 0-5°, 6-10°, 11-15°, etc.) and then looking up that particular range in an appropriately configured look-up table. It will be appreciated that in certain embodiments, the set-speed corresponding to a particular roll angle range may be different depending on the number and location of vehicle occupants. For example, the set-speed may be higher for a driver-only scenario such as that described above than it is for a multi-occupant scenario. Similarly, the set-speed may be higher for two occupants than it is for three or more occupants as the comfort level of different occupants may vary.

In another example, assume that the vehicle is being driven by user "A" and the terrain the vehicle is traversing is a boulder field. Assume further that the automatic determination of a baseline set-speed in step 106 will be triggered when both the vehicle is being driven by user A and the vehicle is traversing a boulder field vehicle. When it is determined in step 104 that both of these conditions are met, step 106 will comprise determining a baseline set-speed that corresponds to that particular combination of conditions (e.g., user A and the prevailing terrain being a boulder field). This may comprise, for example, looking up "user A" and "boulder field" in an appropriately configured look-up table that correlates both user identify and terrain type with set-speed baselines to determine the baseline set-speed for the given scenario. Accordingly, it will be appreciated that in instances wherein, for example, different baseline set-speeds may be associated with different users/drivers, the memory may be arranged or partitioned by, for example, terrain type or classification such that different values for a given terrain classification unique to, for example, different users may be stored in different portions of the memory. In this way, for a given terrain classification there may be stored in the memory a baseline set-speed for one or more particular users.

It will be appreciated that the examples set forth above are meant to be non-limiting examples provided for illustrative purposes only. In practice, step 106 may involve the use of any number of conditions or combinations thereof, and thus, the present invention is not intended to be limited to the determination of a baseline set-speed based on any one or more particular conditions. Further, in an embodiment, step 106 may be performed by VCU 16, though in other embodiments it may be performed by another suitable component of vehicle 10.

Once the baseline set-speed is determined in step 106, method 100 may include a further step 108 of adjusting the baseline set-speed based on a desired comfort level to determine an instantaneous set-speed of the speed control system. More particularly, in an embodiment, a signal indicative of a desired comfort level may be received or generated and then an instantaneous set-speed of the vehicle may be determined by adjusting the baseline set-speed based on the desired comfort level represented by the signal.

The signal indicative of a desired comfort level may originate from a number of sources. For example, in an embodiment, a user may be able to manually select a desired comfort level using, for example, one or more appropriately configured user interface devices (e.g., user interfaces 44). This may comprise, for example, choosing a desired comfort level from among a plurality of comfort levels that reflect varying degrees of comfort. For example, a first comfort level may correspond to a high degree of comfort, a second comfort level may correspond to an intermediate degree of comfort, and a third level may correspond to a low degree of comfort. In another instance, the comfort level may foe incrementally adjusted as opposed to selecting previously defined comfort levels so as to allow for the comfort level to be "dialed in" to provide more fine-tuned and precise comfort control. For example, a user may be able to manually select a desired comfort level and/or change (e.g., increase or decrease) a previously-set or default comfort level using one or more user interface devices. The user's selection may take into account any number of considerations, such as, for example, the user's personal preferred degree of comfort in view of one or more existing conditions (e.g., the classification/type of terrain being traversed, the attitude of the vehicle, etc.), the comfort of one or more passengers in the vehicle in view of the prevailing conditions, and the like. Regardless of the particular reasons why a user may select a particular comfort level, a signal representative of a user-selected comfort level (e.g., user signal or user-input signal) may be generated in response to the user's selection and communicated to, for example, the particular component of vehicle 10 that is performing step 106 (e.g., VCU 16).

In another embodiment, in addition to, or instead of, the signal indicative of a desired comfort level being generated and received in response to a user input, the signal may be generated and then adjusted by the speed control system itself. More particularly, the speed control system may be configured to monitor certain parameters or conditions and automatically select a comfort level, or change or adjust an existing comfort level to a new comfort level, that corresponds to that or those monitored parameters or conditions. For example, and as described in greater detail above, the speed control system may be configured to defect the occupancy of the vehicle including, for example, the identity of the driver, the number and location of vehicle occupants, etc. The speed control system may be further configured to automatically select a comfort level based on the defected occupancy of the vehicle. Accordingly, if the system detects, senses, derives, or otherwise determines, either automatically or in response to, for example, a user input, that the vehicle is being operated by a particular user, the system may automatically select a comfort level that is associated with that particular user. Similarly, if the vehicle is occupied by a user/driver and one or more passengers who are located in particular seats or at particular locations within the vehicle, the system may automatically select the comfort level that corresponds to the current occupancy of the vehicle, recognizing that the comfort level of the passengers of the vehicle may be different than that of the driver. Additionally, or alternatively, the system may select a comfort level that is appropriate for certain prevailing terrain-related conditions (e.g., type/classification of the terrain, roughness, etc.). More particularly, the system may detect that the vehicle is traversing a particular type of terrain, and then select either a comfort level that is deemed to be appropriate for that particular terrain type. In an embodiment, the system may also be configured to override or adjust a selection of a comfort level selected by a user if the system detects that certain conditions are met For example, if the system detects that there are multiple vehicle occupants and/or the vehicle occupants are located in certain positions, the system may adjust the comfort level selected by the user to account for those conditions. It will be appreciated that any number of conditions may be used by the speed control system to select or determine a comfort level (including, for example, those described above and/or some or ail of those evaluated step 104 and used to determine the baseline set-speed in step 106), and thus, the examples above are provided for illustrative purposes only and are not meant to be limiting in nature.

Regardless of the conditions used by the system to automatically select or determine a comfort level, in an embodiment, the system may utilize a look-up table or other suitable data structure stored in a memory device that is part of, or accessible by, the component performing step 108 (e.g., VCU 16) that correlates the relevant condition(s) with comfort level to determine or select the appropriate comfort level for that or those conditions. As such, the selected comfort level may comprise a comfort level that was previously associated with the relevant conditions. More specifically, and as with the predefined baseline set-speeds described above, the comfort level may be a default level set by, for example, the manufacturer during the design, manufacture, and/or installation of vehicle 10, or alternatively, it may be a user-defined level that was set by the user during a previous occurrence of the same conditions. The manner in which the user may set or define a comfort level is substantially the same as that described above with respect to the defining of baseline set-speeds, and as such, the description above will not be repeated, but rather is incorporated here by reference.

In an embodiment, a user- or system-defined comfort level for a particular condition or set of conditions may overwrite a previously-set comfort level, be if a manufacturer-set or user-system-set level, to increase or decrease the previously-set comfort level in much the same way as that described above with respect to the overwriting of previously-set baseline set-speeds. Accordingly, the description above as to how this may done with respect to baseline set-speeds will not be repeated, but rather is incorporated here by reference, in another embodiment however, and as described above with respect, to determining a baseline set-speed in step 106, rather the user-or system-defined comfort levels overwriting manufacturer-set comfort levels, the comfort/composure setting or feature of the speed control system may be operable in two different modes—one in which manufacturer-set comfort levels are used, and another in which user- or system-defined comfort levels are used. In such an embodiment, the user may be able to select which mode of operation is desired using, for example, one or more user interlace devices (e.g., user interface devices 44). For example, the user may not be the normal driver of that particular vehicle, and thus, may want to use manufacturer-defined comfort levels that may be more conservative or less aggressive than those that may have been defined by another person. In such an embodiment, the manufacturer-defined comfort levels are not overwritten by a subsequent, user-defined comfort level, but rather both may be associated with the corresponding condition(s) and their use dictated by the particular mode in which the speed control system, and the comfort/composure setting thereof, in particular, is operated.

Regardless of how the system determines a desired comfort level, a signal representative of the comfort level may be generated or adjusted accordingly in response to the system's determination or selection of the desired comfort level, which may then be used by the particular component of vehicle 10 that is performing step 108 (e.g., VCU 16) as will be described below.

In either of the embodiments described above, the desired comfort level may comprise a maximum desired occupant (i.e., driver or passenger) excitation, or occupant excitation upper limit, defined by the movement of the vehicle, sensory comfort defined by one or more operational parameters of the vehicle (e.g., acceleration, change in vehicle attitude, a slip event, etc), or both. Occupant excitation comprises the effects vehicle body movement (e.g., pitch, roil, yaw, etc. of the vehicle body) has on the occupant(s) of the vehicle (i.e., driver and/or passenger(s)). A maximum or upper limit occupant excitation will be understood to be a comfort level at which the effects or result of vehicle body movement are at level at which the user finds tolerable. For example, different users/drivers may tolerate a different level of excitation that may be experienced during vehicle operation, A sensory comfort will be understood to be a comfort level at which the user's sensory perception of the travel of the vehicle is at a level which the user finds comfortable. For example, different users/drivers may be comfortable with a different level of slip events at the wheels of the vehicle, or may be comfortable with a particular speed of the vehicle on a descent down a steep incline, independently of the physical movement of the vehicle. For example, once a particular comfort level is selected or determined, a signal indicative of the desired comfort level may be generated and used as described below.

With continued reference to FIG. 5, once the desired comfort level is determined, it may be used to adjust the baseline set-speed determined in step 106 to determine an instantaneous set-speed of the speed control system. The instantaneous set-speed is the set-speed at which the vehicle is to be operated in view of the prevailing conditions and the desired comfort level, The adjustment of the baseline set-speed may be accomplished in a number of ways.

For example, in an embodiment, each comfort level may have a multiplier associated therewith (and a signal indicative thereof) that may be applied to the baseline set-speed to determine an instantaneous set-speed when that particular comfort level is desired. In such an embodiment, a look-up table or other suitable data structure stored in a memory device of, or accessible by, the component performing step 108 (e.g., memory device 22 of VCU 16) that correlates comfort level with such multipliers may be used to determine the appropriate multiplier for a given desired comfort level. For example, assume that the speed control system has three (3) comfort levels: "comfort level 0; " "comfort level 1+;" and "comfort level 1-." Assume further that; "comfort level 0;" equates to 100% of the baseline set-speed, and therefore, has a multiplier of 1.0: "comfort level 1+", which corresponds to more comfort than comfort level 0, equates to 80% of the baseline set-speed, and therefore, has a multiplier of 0.8; and "comfort level 1-", which corresponds to less comfort than both comfort level 0 and comfort level 1+, equates to 115% of the baseline set-speed, and therefore, has a multiplier of 1.15. If the baseline set-speed is 7 mph (approximately 11 kph), the instantaneous set-speed for each of the aforementioned comfort levels would be as follows: "comfort level 0"-7 mph (approximately 11 kph); "comfort level 1+"-5.6 mph (approximately 9 kph); and "comfort level 1-"-8 mph (approximately 13 kph). Accordingly, depending on the selected comfort level, the baseline set-speed may be increased to decrease ride comfort (comfort level 1+), decreased to increase ride comfort (comfort level 1-), or left alone (comfort level 0).

In another embodiment, the baseline set-speed may be deemed or considered to be a maximum set-speed and, as with the embodiment, described above, each comfort level may have a multiplier associated therewith (each multiplier having an electrical signal indicative of that multiplier) that may be applied to the baseline set-speed to determine an instantaneous set-speed when that particular comfort level is desired. One difference between this embodiment and that described above, however, is that each of the multipliers, regardless of comfort level, will result in an instantaneous set-speed that is below the baseline set-speed determined in step 106. In such an embodiment, a look-up table or other suitable data structure stored in a memory device of, or accessible by, the component performing step 108 (e.g., memory device 22 of VCU 16) that correlates comfort level with such multipliers may be used to determine the appropriate multiplier for a given desired comfort level. For example, once again that the speed control system has the same three comfort levels described in the example above, but now assume that: "comfort level 0" equates to 60% of the baseline set-speed, and therefore, has a multiplier of 0.6; "comfort level 1+" (more comfort) equates to 50% of the baseline set-speed, and therefore, has a multiplier of 0.5; and "comfort level 1−" (less comfort) equates to 70% of the baseline set-speed, and therefore, has a multiplier of 0.7 If the baseline set-speed is 7 mph (approximately 11 kph), the instantaneous set-speed for each of the aforementioned comfort levels would be as follows: "comfort level 0"-4.2 mph (approximately 7 kph); "comfort level 1+"-3.5 mph (approximately 6 kph): and "comfort level 1−"-4.9 mph (approximately 8 kph). Accordingly, in such an embodiment, the baseline set-speed may be adjusted below the original maximum set-speed determined in step 106 in varying degrees to obtain the desired comfort level.

in either of the embodiments described above, the particular values of the multipliers, and therefore, the resulting adjustment to the baseline set-speed may also be dependent upon one or more factors including, for example, vehicle occupancy. For instance, whether or not vehicle occupancy is taken into account either determining the baseline set-speed in step 106 or determining or selecting the desired comfort level, in an embodiment, it may additionally or alternatively be used to adjust the multipliers if, for example, the system detects that there are one or more passengers (in addition to the driver) in the vehicle. In such an embodiment, the particular adjustment made to the multipliers may be dependent upon, for example, the particular locations of the passengers within the vehicle (e.g., rear seat passengers are more likely to experience a different level of comfort than front seat passengers). It will be appreciated that other factors or conditions may be used in addition to, or instead of, vehicle occupancy (e.g., terrain-related factors) to identity an appropriate multiplier for a given comfort level. Accordingly, the present invention is not meant to be limited to the use of any particular factor(s) or conditions(s).

In another embodiment, the signal indicative of the desired comfort level may have a predetermined acceptable value or range associated therewith for one or more operating parameters of the vehicle, such as, for example, one or more of those corresponding to the signals representative of vehicle-related information received in step 102 (e.g., those relating to the movement of or within the suspension—e.g., wheel articulation). This predetermined parameter value (which may be a maximum or minimum value) or range may be acquired from, for example, a look-up table or other suitable data structure that is stored in a memory device of, or that is associated with, the component of the speed control system performing step 100 (e.g., memory device 22 of VCU 16) that correlates, for example, comfort level with the value(s) or range(s) of the parameters) of interest. The electrical signal corresponding to the particular parameters) of interest would be monitored or processed and the baseline set-speed of the speed control system would be adjusted upwards or downwards until the value of the parameter meets the predetermined value, or, in certain embodiments, meets or exceeds fin the instance wherein the predetermined value is a minimum value) or falls below (in the instance wherein the predetermined value is a maximum value) the predetermined value, or otherwise falls within a given range indicative of a desired ride comfort level. The value of the adjusted baseline set-speed at which the condition is met will then be determined to be the instantaneous set-speed of the vehicle. In such an embodiment, different comfort levels may have different predetermined values or ranges for the same operating parameters) that reflect different levels of comfort. Accordingly, in this embodiment, closed-loop control is utilized to adjust the baseline set-speed a particular amount to achieve or determine an instantaneous set-speed that is commensurate with the desired comfort level.

In yet another embodiment, step 108 may comprise determining the instantaneous set-speed from the desired comfort level and the conditions that were determined to be met in step 104. More specifically, each comfort level may have a set-speed associated therewith for each condition or combination of conditions that may be evaluated in step 104. For example, each comfort level may have a set-speed associated therewith that corresponds to each terrain classification. Similarly, each comfort level may have a set-speed associated therewith that corresponds to a combination of certain conditions, such as, for example, a condition relating to the occupancy of the vehicle (e.g., number and/or location of occupants) and a condition relating to the attitude of the vehicle (e.g., vehicle body roll angle). Each of these set-speeds may be stored in a look-up table or other data structure stored in a memory device that is part of, or associated with, the component of the vehicle 10 performing step 108 (e.g., memory device 22 of VCU 16) that correlates comfort level and the relevant conditions with set-speed. Accordingly, when a signal indicative of a certain desired comfort level is received, the corresponding comfort level may be looked up in the look-up table along with the prevailing conditions and an instantaneous set-speed may be acquired. This value may then be compared with the baseline set-speed and the baseline set-speed may be adjusted accordingly to match the instantaneous set-speed.

While several examples of techniques or ways in which the instantaneous speed may be determined have been described above, it will be appreciated that techniques in addition to, or instead of, those described herein may be used, and therefore, the present invention is not limited to any particular technique(s) for doing so.

Regardless of the particular way in which the baseline set-speed is adjusted to determine an instantaneous set-speed of the speed control system, in an embodiment such as, but not limited to, one or more of those described above wherein the baseline set-speed is deemed to be a maximum set-speed of the speed control system (i.e., the maximum set-speed at which the vehicle may operate and that the user or speed control system may command the vehicle to operate at), the adjustment to the baseline set-speed in step 108 comprises maintaining the set-speed below the original value of the baseline set-speed. Accordingly, in such an embodiment, the adjustment to the baseline set-speed in step 108 may comprise reducing the baseline set-speed, but not increasing it. Similarly, in another embodiment wherein the baseline set-speed comprises a maximum set-speed and the speed control system further includes a minimum set-speed below which the vehicle should not be permitted to travel while the speed control system is operational, the adjustment to the baseline set-speed in step 108 comprises maintaining the set-speed below the original baseline set-speed and above the minimum set-speed. Accordingly, in such an embodiment, the adjustment to the baseline set-speed in step 108 may comprise adjusting the baseline set-speed to a value within the window between the original baseline set-speed (i.e., maximum set-speed) and the minimum set-speed.

In an embodiment, the functionality of step 108 described above may be performed by VCU 16, though in other embodiments it may be performed by another suitable component of vehicle 10.

Once the instantaneous set-speed of the speed control system has been determined in step 108, method 100 may include a step (not shown) of causing the vehicle to operate in accordance with the determined instantaneous set-speed. This may comprise adjusting (e.g., reducing or increasing) the set-speed of the speed control system from a previously selected or determined set-speed to the instantaneous set-speed, and/or not allowing a user to select a set-speed that exceeds the instantaneous set-speed. It will be appreciated that an adjustment to the set-speed of the speed control system may also cause an adjustment in or to the actual speed of the vehicle from the speed corresponding to the previously selected set-speed to that corresponding to the instantaneous set-speed, and in an embodiment, this adjustment may be made in accordance with a predetermined acceleration corridor (e.g., +/−0.1-0.2 g). Accordingly, in an instance wherein the speed of the vehicle is adjusted, one or more commands may be generated and communicated to the appropriate vehicle subsystem (e.g., powertrain subsystem $12_1$, brake subsystem $12_3$, etc.) to effect the adjustment in or to the speed of the vehicle, and more particularly, to control the net torque output of one or more wheels of the vehicle. In such an embodiment, a message may be provided to the user via, for example, a user interface device (e.g., user interface devices 44) prior to or during either the change in the set-speed or the change in the actual vehicle to notify the user that the vehicle will be changing speeds so as to not alarm the user and/or cause the user to unknowingly override the system unnecessarily. A similar message or notification may also be provided to the user any time the speed of the vehicle is capped such that a speed above a maximum set-speed cannot be maintained or commanded so that the user does not perceive the reduction in speed or the inability to increase the speed to be a fault with the vehicle. In an embodiment, some or all of the functionality described above may be performed by VCU 16, though in other embodiments, some or all of the functionality may be performed by another suitable component or means of vehicle 10, including, but not limited to: the ECU 42 (in an instance wherein the VCU 16 does not comprise the ECU of the LSP control system 28); a controller of one or more of the subsystems 12 of the vehicle 10; a controller for controlling one or more of a vehicle powertrain and brake system to control the net torque output of one or more wheels of the vehicle, and/or any other suitable component or device of vehicle 10.

In addition to the above, in certain embodiments, the comfort/composure setting of the speed control system embodied in or by method 100 may be overridden by the user so as to effectively deactivate the setting or feature. For example, in an embodiment, following the determination of the instantaneous set-speed in step 108, but prior to or during the adjustment of either the set-speed or actual speed of the vehicle, the user may be prompted, through for example, one or more appropriately configured user interface devices (e.g., user interface devices 44) to accept or reject the instantaneous set-speed determined in step 108, or at least given the opportunity to reject it. If the adjustment is rejected, the instantaneous set-speed determined in step 108 will be disregarded and if the set-speed or actual speed of the vehicle has been or is in the process of being adjusted to meet that instantaneous set-speed, it may be returned to its original value or to some other value selected by the system or user (e.g., the set-speed in effect when the maximum set-speed was determined). Additionally, or in the alternative, if, in an embodiment, the user attempts to manually increase the set-speed of the vehicle to a set-speed that exceeds the instantaneous set-speed at any time following the determination made in step 106, this modification may override the determination made in step 108. In response, if the set-speed or actual speed of the vehicle has been or is in the process of being adjusted to the instantaneous set-speed, it will be re-adjusted to meet the user-selected set-speed.

Accordingly, if, following step 108, a user input signal representative of a user-selected set-seed is received, the set-speed of speed control system may be modified or adjusted from the instantaneous set-speed to the user-selected set speed to comport with the user's instructions.

In an embodiment, the user-selected set-speed described above may be recorded or stored in a memory device (e.g., memory device 22 of VCU 16) and associated therein with information relating to one or more vehicle-related conditions corresponding to the particular time at which the set-speed was selected by the user (e.g., information relating to, for example, terrain classification, vehicle occupancy, vehicle operating parameters, etc.). This set-speed may then either overwrite -the previous baseline set-speed corresponding to that or those vehicle-related conditions, or if may be used with the previous baseline set-speed to derive yet another baseline set-speed for that or those conditions (e.g., averaged). Accordingly, the next time the same conditions are encountered, the baseline set-speed determined in step 106 will be the user-selected set-speed, or a different set-speed derived therefrom, rather than the predefined baseline set-speed used during a previous performance of method 100. In another embodiment, the previous baseline set-speed is overwritten by the user-selected set-speed only if the user repeatedly overrides the system a certain number of times as opposed to it being an isolated instance, which may or may not be intentional. Further, in an embodiment, when a user overrides the system in, for example, the manner described above, and various vehicle-related information or data is recorded (e.g., operational parameters, type and/characteristic(s) of prevailing terrain, etc.), that information may be used to determine whether the override was because of one particular condition alone (e.g., terrain) or because of a combination of conditions (e.g., terrain in conjunction with one or more parameters affecting body movement). Whether or not passengers are in the vehicle when the user intervenes to override the system may also be determined. In the event there are no passengers in the vehicle, it may be determined that if a similar scenario or the same conditions are encountered in the future when there are passengers in the vehicle, the baseline set-speed corresponding to that or those conditions for when there are multiple vehicle occupants may be adjusted to, for example, a level that is lower than that to which it was reduced when there were no passengers. Accordingly, there are a number of ways in which set-speed baselines may be derived and/or adjusted (overwritten) during operation of the vehicle. Additionally, or in the alternative, at the time the user-selected set-speed is recorded in the memory, in an embodiment the method may further include correlating, in the memory device, the user-selected set-speed to the desired comfort level (e.g., user-set comfort level) for one or more vehicle-related conditions (e.g., the predetermined conditions determined to be met in step 104). In such an embodiment, step 108 of adjusting the baseline set-speed to determine an instantaneous set-speed may include adjusting the baseline set-speed to the recorded user-selected set-speed. In an embodiment, the functionality described above is performed by VCU 16, though in other embodiments it may be performed by another suitable component.

Once an instantaneous set-speed has been determined in step 108 (and, in at least certain instances, the set-speed of the speed control system has been adjusted to that instantaneous set-speed), method 100 may be repeated one or more times to determine whether the instantaneous set-speed is still appropriate, in other words, method 100 may be repeated to detect or determine whether the conditions that necessitated the determination of the instantaneous set-speed in step 108 continue to be met, and, if necessary, to adjust the set-speed appropriately. If it is determined in step 104 of a second or subsequent, performance of method 100 that the relevant conditions are still met, then the instantaneous set-speed of the speed control system will remain unchanged unless the user manually overrides the set-speed and/or either deactivates or suspends operation of the speed control system, or the desired comfort level has changed. If, however, it is determined or detected that the relevant conditions are no longer met, and/or that a new desired comfort level has been selected, a new instantaneous set-speed will be determined in step 108 of the second or subsequent performance of the method that is appropriate for the prevailing conditions and comfort level at that time in an embodiment wherein the instantaneous set-speed of the speed control system (and possibly the actual speed of the vehicle) was adjusted to the instantaneous set-speed as described above and determined in step 108, this or another step of method 100 may also comprise re-adjusting (e.g., increasing) the set-speed (and possibly the actual vehicle speed) of the vehicle from the instantaneous set-speed back to that corresponding to the set-speed in effect lust prior to the instantaneous set-speed being determined in step 108 during a prior performance of method 100, or to an altogether different set-speed. This speed adjustment may be accomplished in the same or similar manner as that described above, and thus, will not be repeated here. The method 100 may be continuously repeated in accordance with a predetermined sampling rate for as long as the speed control system, or at least the comfort/composure setting thereof, remains active, in an embodiment, the functionality described above may be performed by VCU 16, though in other embodiments it may be performed by another suitable component.

It will be appreciated in view of the above that a benefit of the present system and method, among others, is that when certain conditions are encountered by the vehicle, be if terrain-related, vehicle body movement-related, vehicle occupancy-related, vehicle load- of use-case related, or otherwise, and a particular desired comfort level has been identified, an instantaneous set-speed is determined with little or no user involvement in order to enhance one or both of vehicle composure and vehicle occupant comfort while such conditions are encountered or persist.

It will be understood that the embodiments described above ere given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations en the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Oilier terms are to be construed using their broadest reasonable meaning unless they are used in a context that requires a different interpretation.

The invention claimed is:

1. A method of operating a speed control system of a vehicle on an off-road terrain, the vehicle having a vehicle body and an electronic control unit (ECU), the method comprising:
   receiving, by the ECU, one or more electrical signals representative of vehicle-related information;
   determining, by the ECU, based on the one or more electrical signals representative of vehicle-related information, whether one or more predetermined conditions are met;
   when it is determined by the ECU that at least one of the one or more predetermined conditions are met, automatically determining, by the ECU, a baseline set-speed for the speed control system; and
   based on a signal indicative of a desired comfort level comprising an occupant excitation upper limit corresponding to a level of tolerable vehicle body movement, adjusting, by the ECU, the baseline set-speed to determine an instantaneous off-road set-speed of the speed control system, the instantaneous off-road set-speed of the speed control system being lower than the baseline set-speed so as to address the desired comfort level on a particular type of off-road terrain over which the vehicle is travelling, the particular type of off-road terrain being one of sand, gravel, boulders, mud or grass;
   wherein the step of determining, based on the one or more electrical signals representative of vehicle-related information, whether one or more predetermined conditions are met comprises determining the particular type of off-road terrain; and
   monitoring, using the vehicle-related information, one or more operational parameters of the vehicle and determining whether the one or more predetermined conditions are met based at least in part on the monitored operational parameters of the vehicle.

2. A non-transitory computer readable medium carrying a computer-readable code for controlling the vehicle to carry out the method, according to claim 1, of operating a speed control system of the vehicle.

3. The method of claim 1, wherein the step of determining, based on the one or more electrical signals representative of vehicle related information, whether one or more predetermined conditions are met comprises determining a roughness of the terrain directly over which the vehicle is travelling.

4. The method of claim 1, further comprising the step of detecting the type of off-road terrain using a vehicle sensor.

5. The method of claim 1, wherein the step of adjusting the baseline set-speed to determine the instantaneous off-road set speed includes correlating the desired comfort level with the instantaneous off-road set speed using a look-up table comprising a plurality of set-speeds for the desired comfort level.

6. A speed control system for a vehicle on an off-road terrain, the vehicle comprising:
a vehicle body;
a speed controller; and
an electronic control unit (ECU) in communication with the speed controller, the ECU configured to:
receive one or more electrical signals representative of vehicle-related information;
determine, based on the one or more electrical signals representative of vehicle-related information, whether one or more predetermined conditions are met;
automatically determine a baseline set-speed for the speed control system when it is determined that at least certain of the one or more predetermined conditions are met;
adjust the baseline set-speed to determine an instantaneous off-road set-speed of the speed control system based on a signal indicative of a desired comfort level comprising an occupant excitation upper limit corresponding to a level of tolerable vehicle body movement, the instantaneous off-road set-speed of the speed control system being lower than the baseline set-speed so as to address the desired comfort level on a particular type of off-road terrain over which the vehicle is travelling, the particular type of off-road terrain being one of sand, gravel, boulders, mud or grass;
determine, based on the one or more electrical signals representative of vehicle-related information, whether one or more predetermined conditions are met by: determining the particular type of off-road terrain; and
monitor, using the vehicle-related information, one or more operational parameters of the vehicle and determining whether the one or more predetermined conditions are met based at least in part on the monitored operational parameters of the vehicle.

7. The system of claim 6, wherein the desired comfort level comprises at least a sensory comfort defined by one or more of speed, change in vehicle attitude, and slip events.

8. The system according to claim 6, wherein each one or more electrical signals has one or more threshold values associated therewith, and wherein the ECU is configured to determine whether one or more predetermined conditions are met by processing the one or more electrical signals and determining if any of the one or more electrical signals exceeds the one or more threshold values associated therewith.

9. The system according to claim 6, wherein the ECU is configured to:
adjust the baseline set-speed to determine an instantaneous set-speed by reducing the baseline set-speed to increase ride comfort; or
adjust the baseline set-speed to determine an instantaneous set-speed by increasing the baseline set-speed to decrease ride comfort; or
where the baseline set-speed is a maximum set-speed, adjust the baseline set-speed to determine an instantaneous set-speed of the speed control system by reducing the maximum set-speed to obtain the desired comfort level.

10. The system according to claim 6, wherein the ECU is further configured to, based on the one or more electrical signals representative of vehicle-related information, determine a maximum set-speed, and to maintain the instantaneous set-speed below the maximum set-speed.

11. The system according to claim 10, wherein the ECU is configured to determine a minimum set-speed and to adjust the baseline set-speed to determine an instantaneous set-speed having a value between the minimum set-speed and maximum set-speed.

12. The system according to claim 6, wherein the ECU is further configured to automatically adjust the baseline set-speed of the speed control system to the instantaneous set-speed, and wherein the speed controller is configured to control the speed of the vehicle to the instantaneous set-speed.

13. The system according to claim 12, wherein the ECU is configured to:
automatically adjust the baseline set-speed of the speed control system to the instantaneous set-speed by reducing or increasing the baseline set-speed until the one or more electrical signals representative of vehicle-related information fall within a range indicative of a desired ride comfort level, and
to process the one or more electrical signals and to reduce or increase the baseline set-speed until the processed one or more electrical signals fall within the range indicative of the desired ride comfort level.

14. The system of claim 12, wherein following the adjustment of the baseline set-speed of the speed control system to the determined instantaneous set-speed, the ECU is further configured to:
detect whether the at least certain of the one or more predetermined conditions are met; and
when it is detected that at least one of the one or more predetermined conditions are not met, adjust the baseline set-speed of the vehicle from the instantaneous set-speed to a different set-speed.

15. The system according to claim 12, wherein the speed controller is configured to control one or more of a vehicle powertrain and a vehicle brake system, to control a net torque output of one or more wheels of the vehicle.

16. The system of claim 6, wherein the ECU is further configured to:
detect an identity of a user of the vehicle; and
determine the desired comfort level based at least in part on the identity of the user.

17. The system of claim 6, wherein the ECU is configured to receive a user input indicative of the desired comfort level.

18. The system of claim 17, wherein the ECU is configured to receive a user signal to increase or decrease a stored default comfort level.

19. The system of claim 6, wherein following the determination of the instantaneous set-speed, the ECU is further configured to:
receive a user input signal representative of a user-selected set-speed; and
in response to the user input signal, modify the instantaneous set-speed to the user-selected set-speed.

20. The system of claim 19, wherein the ECU is further configured to record the user-selected set-speed in a memory device, and to correlate the user-selected set-speed in the memory device with the one or more predetermined conditions.

21. The system according to claim 6, wherein the ECU is further configured to:
detect at least one of a number of occupants in the vehicle and relative positions of the occupants of the vehicle; and
adjust the signal indicative of the desired comfort level based, at least in part, thereon.

22. The system of claim 6, wherein the baseline set-speed corresponds to a baseline set-speed defined by a user of the vehicle during a previous occurrence of the one or more predetermined conditions being met.

23. A vehicle comprising the system recited in claim 6.

* * * * *